United States Patent
Wu et al.

(10) Patent No.: US 10,666,398 B2
(45) Date of Patent: May 26, 2020

(54) INFORMATION PROCESSING METHOD, APPARATUS, AND SYSTEM

(71) Applicant: Huawei Technologies Co., Ltd., Shenzhen, Guangdong (CN)

(72) Inventors: Zuomin Wu, Shenzhen (CN); Sha Ma, Beijing (CN); Chaojun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/900,678

(22) Filed: Feb. 20, 2018

(65) Prior Publication Data

US 2018/0175974 A1    Jun. 21, 2018

Related U.S. Application Data

(63) Continuation of application No. PCT/CN2015/087863, filed on Aug. 21, 2015.

(51) Int. Cl.
*H04W 4/00* (2018.01)
*H04L 1/18* (2006.01)
*H04L 29/08* (2006.01)
*H04L 1/16* (2006.01)
*H04L 12/26* (2006.01)
*H04W 72/04* (2009.01)
(Continued)

(52) U.S. Cl.
CPC .......... *H04L 1/1812* (2013.01); *H04L 1/1685* (2013.01); *H04L 29/08* (2013.01); *H04L 43/0864* (2013.01); *H04W 72/0446* (2013.01); *H04L 1/0025* (2013.01); *H04L 1/189* (2013.01); *H04W 88/08* (2013.01)

(58) Field of Classification Search
USPC ................................ 370/328, 329, 334, 373
See application file for complete search history.

(56) References Cited

U.S. PATENT DOCUMENTS 6,721,805 B1    4/2004  Bhagwat et al.
9,923,673 B2 *  3/2018  Li .......................... H04L 1/1854
(Continued)

FOREIGN PATENT DOCUMENTS

CN    101060388 A    10/2007
CN    101064589 A    10/2007
(Continued)

OTHER PUBLICATIONS

CN 201580081387.0, Office Action, dated Jun. 20, 2019.

*Primary Examiner* — Phuongchau Ba Nguyen
(74) *Attorney, Agent, or Firm* — Leydig, Voit & Mayer, Ltd.

(57) ABSTRACT

A base station determines a feedback manner of hybrid automatic repeat request HARQ feedback information of user equipment, where the feedback manner includes: feeding back the HARQ feedback information, or skipping feeding back the HARQ feedback information. The base station also determines first signaling according to the feedback manner of the HARQ feedback information, where the first signaling implicitly indicates the feedback manner of the HARQ feedback information. The base station sends the first signaling to the user equipment, so that the user equipment determines the feedback manner of the HARQ feedback information according to the first signaling.

15 Claims, 6 Drawing Sheets

---

A base station determines a feedback manner of HARQ feedback information of user equipment, where the feedback manner includes: feeding back the HARQ feedback information, or skipping feeding back the HARQ feedback information — 41

The base station determines first signaling according to the feedback manner of the HARQ feedback information, where the first signaling implicitly indicates the feedback manner of the HARQ feedback information — 42

The base station sends the first signaling to the user equipment, so that the user equipment determines the feedback manner of the HARQ feedback information according to the first signaling — 43

(51) Int. Cl.
 *H04L 1/00* (2006.01)
 *H04W 88/08* (2009.01)

(56) References Cited

U.S. PATENT DOCUMENTS

| | | |
|---|---|---|
| 2005/0276266 A1 | 12/2005 | Terry |
| 2008/0165697 A1 | 7/2008 | Zeira et al. |
| 2012/0276896 A1 | 11/2012 | Ren et al. |
| 2016/0261391 A1* | 9/2016 | Chen ................ H04L 5/0048 |
| 2017/0237535 A1* | 8/2017 | Park ................ H04L 5/0035 |
| | | 370/329 |
| 2017/0290008 A1* | 10/2017 | Tooher ............... H04L 1/0007 |

FOREIGN PATENT DOCUMENTS

| | | |
|---|---|---|
| CN | 102571265 A | 7/2012 |
| KR | 20120088638 A | 8/2012 |
| KR | 20130018219 A | 2/2013 |

\* cited by examiner

INFORMATION PROCESSING METHOD, APPARATUS, AND SYSTEM

CROSS-REFERENCE TO RELATED APPLICATIONS

This application is a continuation of International Application No. PCT/CN2015/087863, filed on Aug. 21, 2015, the disclosure of which is hereby incorporated by reference in its entirety.

TECHNICAL FIELD

Embodiments of the present application relate to the field of communications technologies, and in particular, to an information processing method, an apparatus, and a system.

BACKGROUND

A delay in a mobile network is a key performance indicator (KPI) of a network and directly affects user experience. Continuously emerging new services (for example, a service of the Internet of Vehicles) also impose an increasingly high requirement for the delay.

For example, some end-to-end services have the following requirements for the delay:

It is required that an event trigger delay in an interactive sports game is less than 25 ms;

it is required that a delay of communication between self-driving cars is less than 30 ms;

it is required that a round trip time (RTT) delay in remote control is less than 50 ms;

it is required that a delay in smart grid power automation protection is less than 8 ms; and it is required that a call setup delay in public safety is less than 300 ms, and an end-to-end (E2E) media file transmission delay is less than 150 ms.

Efforts are continuously made to reduce the delay in an evolution process of a mobile communications standard. In an air interface technology, a scheduling interval at a physical layer affects the delay most obviously. The scheduling interval is 10 ms in Wideband Code Division Multiple Access (WCDMA), is shortened to 2 ms in High Speed Packet Access (HSPA), and is shortened to 1 ms in Long Term Evolution (LTE). Because of a requirement for a low-delay service, a short transmission time interval (TTI) frame structure needs to be introduced into an LTE physical layer. To further shorten the scheduling interval, a TTI may be shortened from 1 ms to one symbol to 0.5 ms. The symbol mentioned above may be an orthogonal frequency division multiplexing (OFDM) symbol in an LTE system.

As shown in FIG. 1, FIG. 1 is a delay diagram of a round trip time (RTT) for transmitting data on one symbol. A data transmission RTT is eight symbols. Based on a hybrid automatic repeat request (HARQ) technology, if a base station transmits data to user equipment on a symbol 3, and the user equipment correctly performs demodulation and decoding on received data, the user equipment feeds back an acknowledgement (ACK) character to the base station on a symbol 7; or if the user equipment does not correctly perform demodulation and decoding on received data, the user equipment feeds back a negative acknowledgement (NACK) character to the base station on a symbol 7, and the base station confirms, on a symbol 11, that the ACK/NACK is received. The ACK/NACK is referred to as HARQ feedback information. There are three possible cases in which the user equipment sends the HARQ feedback information. Case 1: The user equipment does not receive, on the symbol 3, a DL grant of a data packet scheduled by the base station, and therefore does not send the HARQ feedback information on the symbol 7. Case 2: The user equipment receives, on the symbol 3, a data packet scheduled by the base station, but does not correctly perform decoding, and therefore send the NACK on the symbol 7. Case 3: The user equipment receives, on the symbol 3, a data packet scheduled by the base station, and correctly performs decoding, and therefore send the ACK on the symbol 7. Correspondingly, performance indicators of the HARQ feedback information include a false alarm and an erroneous detection. The false alarm means that the user equipment does not send the HARQ feedback information or sends the NACK, but the base station considers, by means of detection, that the user equipment sends the ACK, and this is corresponding to the foregoing Case 1 and Case 2. The erroneous detection means that the user equipment sends the ACK, but the base station does not detect the ACK, and this is corresponding to the foregoing Case 3. Usually, when performance of the HARQ feedback information is evaluated, performance of the erroneous detection is considered when a false alarm indicator is reached.

The base station may perform erroneous detection in a HARQ feedback information transmission process, thereby further affecting network performance. As the short TTI frame structure is introduced, there is a higher probability that the base station performs erroneous detection during data transmission in a short TTI than that during data transmission in a normal TTI of 1 ms. Therefore, the data transmission in the short TTI imposes greater impact on the network performance.

That the short TTI is one symbol is used as an example. Analysis is separately performed on impact on the network performance during ACK transmission in a TTI of one symbol and impact on the network performance during ACK transmission in a TTI of 1 ms. It is learned that when the ACK is transmitted by using the TTI of one symbol, when there is a false alarm, when a probability that the user equipment sends the ACK and the base station does not detect the ACK is 0.01, a signal-to-noise ratio of the user equipment is 6.3 dB; however, when the ACK is transmitted by using the TTI of 1 ms, when there is a same false alarm, when a probability that the user equipment sends the ACK and the base station does not detect the ACK is also 0.01, a signal-to-noise ratio of the user equipment is −7.5 dB. By comparison, performance of the ACK when the ACK is transmitted by using the TTI of one symbol is approximately 14 dB less than performance of the ACK when the ACK is transmitted by using the TTI of 1 ms.

Therefore, when data transmission is performed in a short TTI, how to avoid a relatively high loss caused by the HARQ feedback information to the network performance is an urgent problem that needs to be resolved currently.

SUMMARY

Embodiments of the present disclosure provide an information processing method, an apparatus, and a system, so as to resolve a prior-art problem that HARQ feedback information causes relatively great damage to network performance.

According to a first aspect, an information processing method is provided, including:

determining, by a base station, a feedback manner of hybrid automatic repeat request HARQ feedback information of user equipment, where the feedback manner includes: feeding back the HARQ feedback information, or skipping feeding back the HARQ feedback information;

determining, by the base station, first signaling according to the feedback manner of the HARQ feedback information, where the first signaling implicitly indicates the feedback manner of the HARQ feedback information; and sending the first signaling to the user equipment, so that the user equipment determines the feedback manner of the HARQ feedback information according to the first signaling.

With reference to the first aspect, in a first possible implementation, the determining, by a base station, a feedback manner of HARQ feedback information of user equipment includes:

determining, by the base station, a signal-to-noise ratio SNR value of the user equipment; and when the SNR value of the user equipment is less than or not greater than a preset first threshold, determining, by the base station, that the user equipment does not feedback the HARQ feedback information; or when the SNR value of the user equipment is greater than or not less than a preset first threshold, determining, by the base station, that the user equipment feeds back the HARQ feedback information.

With reference to the first possible implementation of the first aspect, in a second possible implementation, the determining, by the base station, an SNR value of the user equipment includes:

determining, by the base station, the SNR value of the user equipment according to a channel quality indicator CQI reported by the user equipment; or determining, by the base station, the SNR value of the user equipment according to an uplink reference signal sent by the user equipment.

With reference to the first aspect, the first possible implementation of the first aspect, or the second possible implementation of the first aspect, in a third possible implementation, the first signaling is radio resource control RRC signaling, Media Access Control MAC signaling, or physical layer signaling.

With reference to the first aspect, the first possible implementation of the first aspect, the second possible implementation of the first aspect, or the third possible implementation of the first aspect, in a fourth possible implementation, the first signaling is modulation and coding scheme MCS indication information, and the MCS indication information indicates an MCS index value or a transport block size TBS index value corresponding to an MCS index value; and the determining, by the base station, first signaling according to the feedback manner of the HARQ feedback information includes:

when the feedback manner of the HARQ feedback information is skipping feeding back the HARQ feedback information, determining, by the base station, the MCS indication information, where the MCS index value or the TBS index value indicated by the MCS indication information is not greater than a preset second threshold; or when the feedback manner of the HARQ feedback information is feeding back the HARQ feedback information, determining, by the base station, the MCS indication information, where the MCS index value or the TBS index value indicated by the MCS indication information is greater than the second threshold.

With reference to the fourth possible implementation of the first aspect, in a fifth possible implementation, when the feedback manner of the HARQ feedback information is skipping feeding back the HARQ feedback information, a transport block size indicated by the MCS indication information is determined according to a target value of a block error rate BLER, and the target value of the BLER is less than 0.1.

With reference to the first aspect, the first possible implementation of the first aspect, the second possible implementation of the first aspect, or the third possible implementation of the first aspect, in a sixth possible implementation, the first signaling is channel state information CSI configuration information, and the CSI configuration information is channel quality indicator CQI table configuration information and/or modulation and coding scheme MCS table configuration information; and the determining, by the base station, first signaling according to the feedback manner of the HARQ feedback information includes:

when the feedback manner of the HARQ feedback information is skipping feeding back the HARQ feedback information, determining, by the base station, CSI configuration information that is used to indicate that the user equipment uses a CQI table and/or an MCS table that do/does not include 256QAM; or when the feedback manner of the HARQ feedback information is feeding back the HARQ feedback information, determining, by the base station, CSI configuration information that is used to indicate that the user equipment uses a CQI table and/or an MCS table that include/includes 256QAM.

With reference to the sixth possible implementation of the first aspect, in a seventh possible implementation, before the determining, by the base station, first signaling according to the feedback manner of the HARQ feedback information, the method further includes:

when the feedback manner of the HARQ feedback information is skipping feeding back the HARQ feedback information, configuring, for the user equipment, the CQI table and/or the MCS table that do/does not include the 256QAM; or when the feedback manner of the HARQ feedback information is feeding back the HARQ feedback information, configuring, for the user equipment, the CQI table and/or the MCS table that include/includes the 256QAM.

With reference to the first aspect, the first possible implementation of the first aspect, the second possible implementation of the first aspect, or the third possible implementation of the first aspect, in an eighth possible implementation, the first signaling is transmission time interval TTI frame structure configuration information; and the determining, by the base station, first signaling according to the feedback manner of the HARQ feedback information includes:

when the feedback manner of the HARQ feedback information is skipping feeding back the HARQ feedback information, determining, by the base station, TTI frame structure configuration information that is used to indicate that the user equipment uses a shortest TTI frame structure in at least two preset different TTI frame structures for data transmission; or when the feedback manner of the HARQ feedback information is feeding back the HARQ feedback information, determining, by the base station, TTI frame structure configuration information that is used to indicate that the user equipment uses, for data transmission, a TTI frame structure that is not the shortest in at least two different TTI frame structures.

With reference to the eighth possible implementation of the first aspect, in a ninth possible implementation, before the determining, by the base station, first signaling according to the feedback manner of the HARQ feedback information, the method further includes:

when the feedback manner of the HARQ feedback information is skipping feeding back the HARQ feedback information, configuring, for the user equipment, a shortest TTI frame structure in the at least two TTI frame structures of different lengths; or when the feedback manner of the HARQ feedback information is feeding back the HARQ feedback information, configuring, for the user equipment, a TTI frame structure that is not the shortest in the at least two TTI frame structures of different lengths.

With reference to the first aspect, the first possible implementation of the first aspect, the second possible implementation of the first aspect, or the third possible implementation of the first aspect, in a tenth possible implementation, the first signaling is repetition quantity information; and the determining, by the base station, first signaling according to the feedback manner of the HARQ feedback information includes:

when the feedback manner of the HARQ feedback information is skipping feeding back the HARQ feedback information, determining, by the base station, repetition quantity information that is used to indicate that a quantity of times that a same transport data block is retransmitted is greater than 1; or when the feedback manner of the HARQ feedback information is feeding back the HARQ feedback information, determining, by the base station, repetition quantity information that is used to indicate that a quantity of times that a same transport data block is retransmitted is not greater than 1.

With reference to the tenth possible implementation of the first aspect, in an eleventh possible implementation, before the determining, by the base station, first signaling according to the feedback manner of the HARQ feedback information, the method further includes:

when the feedback manner of the HARQ feedback information is skipping feeding back the HARQ feedback information, configuring, by the base station for the user equipment, transmission that a quantity of times that a same transport data block is retransmitted is greater than 1, where resources that are consecutive in terms of time and/or frequency or resources that are inconsecutive in terms of time and/or frequency are used for the transmission that the quantity of times that a same transport data block is retransmitted is greater than 1.

With reference to the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, the eighth possible implementation of the first aspect, the ninth possible implementation of the first aspect, the tenth possible implementation of the first aspect, or the eleventh possible implementation of the first aspect, in a twelfth possible implementation, the method further includes:

when the SNR value of the user equipment is greater than or greater than or equal to the preset first threshold and less than or not greater than a preset third threshold, updating, by the base station, a retransmission quantity configured for the user equipment, and using the updated retransmission quantity to perform downlink transmission for the user equipment, where the updated retransmission quantity is greater than the preset retransmission quantity.

According to a second aspect, an information processing method is provided, including:

receiving, by user equipment, first signaling that is sent by a base station and that is used to determine a feedback manner of hybrid automatic repeat request HARQ feedback information of the user equipment, where the feedback manner includes: feeding back the HARQ feedback information, or skipping feeding back the HARQ feedback information; and the first signaling implicitly indicates the feedback manner of the HARQ feedback information; and determining, by the user equipment, the feedback manner of the HARQ feedback information according to the first signaling.

With reference to the second aspect, in a first possible implementation, the first signaling is radio resource control RRC signaling, Media Access Control MAC signaling, or physical layer signaling.

With reference to the second aspect or the first possible implementation of the second aspect, in a second possible implementation, the first signaling is modulation and coding scheme MCS indication information, and the MCS indication information indicates an MCS index value or a transport block size TBS index value corresponding to an MCS index value; and the determining, by the user equipment, the feedback manner of the HARQ feedback information according to the first signaling includes:

when the MCS index value or the TBS index value indicated by the MCS indication information is not greater than a preset second threshold, determining, by the user equipment, not to feed back the HARQ feedback information; or when the MCS index value or the TBS index value indicated by the MCS indication information is greater than a preset second threshold, determining, by the user equipment, to feed back the HARQ feedback information.

With reference to the second aspect or the first possible implementation of the second aspect, in a third possible implementation, the first signaling is channel state information CSI configuration information, and the CSI configuration information is CQI table configuration information and/or MCS table configuration information; and the determining, by the user equipment, the feedback manner of the HARQ feedback information according to the first signaling includes:

when the CSI configuration information indicates that the user equipment uses a CQI table and/or an MCS table that do/does not include 256QAM, determining, by the user equipment, not to feedback the HARQ feedback information; or when the CSI configuration information indicates that the user equipment uses a CQI table and/or an MCS table that include/includes 256QAM, determining, by the user equipment, to feed back the HARQ feedback information.

With reference to the second aspect or the first possible implementation of the second aspect, in a fourth possible implementation, the first signaling is transmission time interval TTI frame structure configuration information; and the determining, by the user equipment, the feedback manner of the HARQ feedback information according to the first signaling includes:

when the TTI frame structure configuration information indicates a shortest TTI frame structure in at least two preset TTI frame structures of different lengths, determining, by the user equipment, not to feed back the HARQ feedback information; or when the TTI frame structure configuration information indicates a TTI frame structure that is not the shortest in at least two preset TTI frame structures of different lengths, determining, by the user equipment, to feed back the HARQ feedback information.

With reference to the second aspect or the first possible implementation of the second aspect, in a fifth possible implementation, the first signaling is repetition quantity information; and the determining, by the user equipment, the feedback manner of the HARQ feedback information according to the first signaling includes:

when the repetition quantity information indicates that a quantity of times that a same transport data block is retransmitted is greater than 1, determining, by the user equipment, not to feed back the HARQ feedback information; or when the repetition quantity information indicates that a quantity of times that a same transport data block is retransmitted is not greater than 1, determining, by the user equipment, to feed back the HARQ feedback information.

According to a third aspect, a base station is provided, including:

a feedback manner determining unit, configured to determine a feedback manner of hybrid automatic repeat request HARQ feedback information of user equipment, where the feedback manner includes: feeding back the HARQ feedback information, or skipping feeding back the HARQ feedback information;

a first signaling determining unit, configured to determine first signaling according to the feedback manner that is of the HARQ feedback information and that is determined by the feedback manner determining unit, where the first signaling implicitly indicates the feedback manner of the HARQ feedback information; and a sending unit, configured to send, to the user equipment, the first signaling determined by the first signaling determining unit, so that the user equipment determines the feedback manner of the HARQ feedback information according to the first signaling.

With reference to the third aspect, in a first possible implementation, the feedback manner determining unit is specifically configured to:

determine a signal-to-noise ratio SNR value of the user equipment; and when the SNR value of the user equipment is less than or not greater than a preset first threshold, determine that the user equipment does not feed back the HARQ feedback information; or when the SNR value of the user equipment is greater than or not less than a preset first threshold, determine that the user equipment feeds back the HARQ feedback information.

With reference to the first possible implementation of the third aspect, in a second possible implementation, that the feedback manner determining unit is configured to determine the signal-to-noise ratio SNR value of the user equipment includes:

determine the SNR value of the user equipment according to a channel quality indicator CQI reported by the user equipment; or determine the SNR value of the user equipment according to an uplink reference signal sent by the user equipment.

With reference to the third aspect, the first possible implementation of the third aspect, or the second possible implementation of the third aspect, in a third possible implementation, the first signaling is radio resource control RRC signaling, Media Access Control MAC signaling, or physical layer signaling.

With reference to the third aspect, the first possible implementation of the third aspect, the second possible implementation of the third aspect, or the third possible implementation of the third aspect, in a fourth possible implementation, the first signaling is modulation and coding scheme MCS indication information, and the MCS indication information indicates an MCS index value or a transport block size TBS index value corresponding to an MCS index value; and the first signaling determining unit is specifically configured to:

when the feedback manner of the HARQ feedback information is skipping feeding back the HARQ feedback information, determine the MCS indication information, where the MCS index value or the TBS index value indicated by the MCS indication information is not greater than a preset second threshold; or when the feedback manner of the HARQ feedback information is feeding back the HARQ feedback information, determine the MCS indication information, where the MCS index value or the TBS index value indicated by the MCS indication information is greater than the second threshold.

With reference to the fourth possible implementation of the third aspect, in a fifth possible implementation, when the feedback manner of the HARQ feedback information is skipping feeding back the HARQ feedback information, a transport block size indicated by the MCS indication information is determined according to a target value of a block error rate BLER, and the target value of the BLER is less than 0.1.

With reference to the third aspect, the first possible implementation of the third aspect, the second possible implementation of the third aspect, or the third possible implementation of the third aspect, in a sixth possible implementation, the first signaling is channel state information CSI configuration information, and the CSI configuration information is channel quality indicator CQI table configuration information and/or modulation and coding scheme MCS table configuration information; and the first signaling determining unit is specifically configured to:

when the feedback manner of the HARQ feedback information is skipping feeding back the HARQ feedback information, determine CSI configuration information that is used to indicate that the user equipment uses a CQI table and/or an MCS table that do/does not include 256QAM; or when the feedback manner of the HARQ feedback information is feeding back the HARQ feedback information, determine CSI configuration information that is used to indicate that the user equipment uses a CQI table and/or an MCS table that include/includes 256QAM.

With reference to the sixth possible implementation of the third aspect, in a seventh possible implementation, the base station further includes:

a first configuration unit, configured to: when the feedback manner that is of the HARQ feedback information and that is determined by the feedback manner determining unit is skipping feeding back the HARQ feedback information, configure, for the user equipment, the CQI table and/or the MCS table that do/does not include the 256QAM; or when the feedback manner that is of the HARQ feedback information and that is determined by the feedback manner determining unit is feeding back the HARQ feedback information, configure, for the user equipment, the CQI table and/or the MCS table that include/includes the 256QAM.

With reference to the third aspect, the first possible implementation of the third aspect, the second possible implementation of the third aspect, or the third possible implementation of the third aspect, in an eighth possible implementation, the first signaling is transmission time interval TTI frame structure configuration information; and the first signaling determining unit is specifically configured to:

when the feedback manner of the HARQ feedback information is skipping feeding back the HARQ feedback information, determine TTI frame structure configuration information that is used to indicate that the user equipment uses a shortest TTI frame structure in at least two preset different III frame structures for data transmission; or when the feedback manner of the HARQ feedback information is feeding back the HARQ feedback information, determine TTI frame structure configuration information that is used to indicate that the user equipment uses, for data transmission, a TTI frame structure that is not the shortest in at least two different TTI frame structures.

With reference to the eighth possible implementation of the third aspect, in a ninth possible implementation, the base station further includes:

a second configuration unit, configured to: when the feedback manner that is of the HARQ feedback information and that is determined by the feedback manner determining unit is skipping feeding back the HARQ feedback information, configure, for the user equipment, a shortest TTI frame structure in the at least two TTI frame structures of different lengths; or when the feedback manner that is of the HARQ feedback information and that is determined by the feedback manner determining unit is feeding back the HARQ feedback information, configure, for the user equipment, a TTI frame structure that is not the shortest in the at least two TTI frame structures of different lengths.

With reference to the third aspect, the first possible implementation of the third aspect, the second possible implementation of the third aspect, or the third possible implementation of the third aspect, in a tenth possible implementation, the first signaling is repetition quantity information; and the first signaling determining unit is specifically configured to:

when the feedback manner of the HARQ feedback information is skipping feeding back the HARQ feedback information, determine repetition quantity information that is used to indicate that a quantity of times that a same transport data block is retransmitted is greater than 1; or when the feedback manner of the HARQ feedback information is feeding back the HARQ feedback information, determine repetition quantity information that is used to indicate that a quantity of times that a same transport data block is retransmitted is not greater than 1.

With reference to the tenth possible implementation of the third aspect, in an eleventh possible implementation, the base station further includes:

a third configuration unit, configured to: when the feedback manner that is of the HARQ feedback information and that is determined by the feedback manner determining unit is skipping feeding back the HARQ feedback information, configure, for the user equipment, transmission that a quantity of times that a same transport data block is retransmitted is greater than 1, where resources that are consecutive in terms of time and/or frequency or resources that are inconsecutive in terms of time and/or frequency are used for the transmission that the quantity of times that a same transport data block is retransmitted is greater than 1.

With reference to the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, the seventh possible implementation of the third aspect, the eighth possible implementation of the third aspect, the ninth possible implementation of the third aspect, the tenth possible implementation of the third aspect, or the eleventh possible implementation of the third aspect, in a twelfth possible implementation, the base station further includes:

a retransmission quantity updating unit, configured to: when the SNR value that is of the user equipment and that is determined by the feedback manner determining unit is greater than or greater than or equal to the preset first threshold and less than or not greater than a preset third threshold, update a retransmission quantity configured for the user equipment, and use the updated retransmission quantity to perform downlink transmission for the user equipment, where the updated retransmission quantity is greater than the preset retransmission quantity.

According to a fourth aspect, user equipment is provided, including:

a first signaling receiving unit, configured to receive first signaling that is sent by a base station and that is used to determine a feedback manner of hybrid automatic repeat request HARQ feedback information of the user equipment, where the feedback manner includes: feeding back the HARQ feedback information, or skipping feeding back the HARQ feedback information; and the first signaling implicitly indicates the feedback manner of the HARQ feedback information; and a feedback manner determining unit, configured to determine the feedback manner of the HARQ feedback information according to the first signaling received by the first signaling receiving unit.

With reference to the fourth aspect, in a first possible implementation, the first signaling is radio resource control RRC signaling, Media Access Control MAC signaling, or physical layer signaling.

With reference to the fourth aspect, or the first possible implementation of the fourth aspect, in a second possible implementation, the first signaling is modulation and coding scheme MCS indication information, and the MCS indication information indicates an MCS index value or a transport block size TBS index value corresponding to an MCS index value; and the feedback manner determining unit is specifically configured to:

when the MCS index value or the TBS index value indicated by the MCS indication information is not greater than a preset second threshold, determine not to feedback the HARQ feedback information; or when the MCS index value or the TBS index value indicated by the MCS indication information is greater than a preset second threshold, determine to feed back the HARQ feedback information.

With reference to the fourth aspect or the first possible implementation of the fourth aspect, in a third possible implementation, the first signaling is channel state information CSI configuration information, and the CSI configuration information is CQI table configuration information and/or MCS table configuration information; and the feedback manner determining unit is specifically configured to:

when the CSI configuration information indicates that the user equipment uses a CQI table and/or an MCS table that do/does not include 256QAM, determine not to feed back the HARQ feedback information; or when the CSI configuration information indicates that the user equipment uses a CQI table and/or an MCS table that include/includes 256QAM, determine to feed back the HARQ feedback information.

With reference to the fourth aspect or the first possible implementation of the fourth aspect, in a fourth possible implementation, the first signaling is transmission time interval TTI frame structure configuration information; and the feedback manner determining unit is specifically configured to:

when the TTI frame structure configuration information indicates a shortest TTI frame structure in at least two preset TTI frame structures of different lengths, determine not to feed back the HARQ feedback information; or when the TTI frame structure configuration information indicates a TTI frame structure that is not the shortest in at least two preset TTI frame structures of different lengths, determine to feed back the HARQ feedback information.

With reference to the fourth aspect or the first possible implementation of the fourth aspect, in a fifth possible implementation, the first signaling is repetition quantity information; and the feedback manner determining unit is specifically configured to:

when the repetition quantity information indicates that a quantity of times that a same transport data block is retransmitted is greater than 1, determine not to feed back the HARQ feedback information; or when the repetition quantity information indicates that a quantity of times that a same transport data block is retransmitted is not greater than 1, determine to feed back the HARQ feedback information.

According to a fifth aspect, a base station is provided, including:

a processor, configured to: determine a feedback manner of hybrid automatic repeat request HARQ feedback information of user equipment, and determine first signaling according to the feedback manner of the HARQ feedback information, where the feedback manner includes: feeding back the HARQ feedback information, or skipping feeding back the HARQ feedback information; the first signaling implicitly indicates the feedback manner of the HARQ feedback information; and a transmitter, configured to send the first signaling to the user equipment, so that the user equipment determines the feedback manner of the HARQ feedback information according to the first signaling.

With reference to the fifth aspect, in a first possible implementation, that the processor determines the feedback manner of the HARQ feedback information of the user equipment includes:

determining a signal-to-noise ratio SNR value of the user equipment; and when the SNR value of the user equipment is less than or not greater than a preset first threshold, determining that the user equipment does not feed back the HARQ feedback information; or when the SNR value of the user equipment is greater than or not less than a preset first threshold, determining that the user equipment feeds back the HARQ feedback information.

With reference to the first possible implementation of the fifth aspect, in a second possible implementation, that the processor determines the signal-to-noise ratio SNR value of the user equipment includes:

determining the SNR value of the user equipment according to a channel quality indicator CQI reported by the user equipment; or determining the SNR value of the user equipment according to an uplink reference signal sent by the user equipment.

With reference to the fifth aspect, the first possible implementation of the fifth aspect, or the second possible implementation of the fifth aspect, in a third possible implementation, the first signaling is radio resource control RRC signaling, Media Access Control MAC signaling, or physical layer signaling.

With reference to the fifth aspect, the first possible implementation of the fifth aspect, the second possible implementation of the fifth aspect, or the third possible implementation of the fifth aspect, in a fourth possible implementation, the first signaling is modulation and coding scheme MCS indication information, and the MCS indication information indicates an MCS index value or a transport block size TBS index value corresponding to an MCS index value; and that the processor determines the first signaling according to the feedback manner of the HARQ feedback information includes:

when the feedback manner of the HARQ feedback information is skipping feeding back the HARQ feedback information, determining the MCS indication information, where the MCS index value or the TBS index value indicated by the MCS indication information is not greater than a preset second threshold; or when the feedback manner of the HARQ feedback information is feeding back the HARQ feedback information, determining the MCS indication information, where the MCS index value or the TBS index value indicated by the MCS indication information is greater than the second threshold.

With reference to the fourth possible implementation of the fifth aspect, in a fifth possible implementation, when the feedback manner of the HARQ feedback information is skipping feeding back the HARQ feedback information, a transport block size indicated by the MCS indication information is determined according to a target value of a block error rate BLER, and the target value of the BLER is less than 0.1.

With reference to the fifth aspect, the first possible implementation of the fifth aspect, the second possible implementation of the fifth aspect, or the third possible implementation of the fifth aspect, in a sixth possible implementation, the first signaling is channel state information CSI configuration information, and the CSI configuration information is channel quality indicator CQI table configuration information and/or modulation and coding scheme MCS table configuration information; and that the processor determines the first signaling according to the feedback manner of the HARQ feedback information includes:

when the feedback manner of the HARQ feedback information is skipping feeding back the HARQ feedback information, determining CSI configuration information that is used to indicate that the user equipment uses a CQI table and/or an MCS table that do/does not include 256QAM; or when the feedback manner of the HARQ feedback information is feeding back the HARQ feedback information, determining CSI configuration information that is used to indicate that the user equipment uses a CQI table and/or an MCS table that include/includes 256QAM.

With reference to the sixth possible implementation of the fifth aspect, in a seventh possible implementation, before the processor determines the first signaling according to the feedback manner of the HARQ feedback information, the processor is further configured to:

when the feedback manner of the HARQ feedback information is skipping feeding back the HARQ feedback information, configure, for the user equipment, the CQI table and/or the MCS table that do/does not include the 256QAM; or when the feedback manner of the HARQ feedback information is feeding back the HARQ feedback information, configure, for the user equipment, the CQI table and/or the MCS table that include/includes the 256QAM.

With reference to the fifth aspect, the first possible implementation of the fifth aspect, the second possible implementation of the fifth aspect, or the third possible implementation of the fifth aspect, in an eighth possible implementation, the first signaling is transmission time interval TTI frame structure configuration information; and that the processor determines the first signaling according to the feedback manner of the HARQ feedback information includes:

when the feedback manner of the HARQ feedback information is skipping feeding back the HARQ feedback information, determining TTI frame structure configuration information that is used to indicate that the user equipment uses a shortest TTI frame structure in at least two preset different III frame structures for data transmission; or when the feedback manner of the HARQ feedback information is feeding back the HARQ feedback information, determining TTI frame structure configuration information that is used to indicate that the user equipment uses, for data transmission, a TTI frame structure that is not the shortest in at least two different TTI frame structures.

With reference to the eighth possible implementation of the fifth aspect, in a ninth possible implementation, before the processor determines the first signaling according to the feedback manner of the HARQ feedback information, the processor is further configured to:

when the feedback manner of the HARQ feedback information is skipping feeding back the HARQ feedback information, configure, for the user equipment, a shortest TTI frame structure in the at least two TTI frame structures of different lengths; or when the feedback manner of the HARQ feedback information is feeding back the HARQ feedback information, configure, for the user equipment, a TTI frame structure that is not the shortest in the at least two TTI frame structures of different lengths.

With reference to the fifth aspect, the first possible implementation of the fifth aspect, the second possible implementation of the fifth aspect, or the third possible implementation of the fifth aspect, in a tenth possible implementation, the first signaling is repetition quantity information; and that the processor determines the first signaling according to the feedback manner of the HARQ feedback information includes:

when the feedback manner of the HARQ feedback information is skipping feeding back the HARQ feedback information, determining repetition quantity information that is used to indicate that a quantity of times that a same transport data block is retransmitted is greater than 1; or when the feedback manner of the HARQ feedback information is feeding back the HARQ feedback information, determining repetition quantity information that is used to indicate that a quantity of times that a same transport data block is retransmitted is not greater than 1.

With reference to the tenth possible implementation of the fifth aspect, in an eleventh possible implementation, before the processor determines the first signaling according to the feedback manner of the HARQ feedback information, the processor is further configured to:

when the feedback manner of the HARQ feedback information is skipping feeding back the HARQ feedback information, configure, for the user equipment, transmission that a quantity of times that a same transport data block is retransmitted is greater than 1, where resources that are consecutive in terms of time and/or frequency or resources that are inconsecutive in terms of time and/or frequency are used for the transmission that the quantity of times that a same transport data block is retransmitted is greater than 1.

With reference to the first possible implementation of the fifth aspect, the second possible implementation of the fifth aspect, the third possible implementation of the fifth aspect, the fourth possible implementation of the fifth aspect, the fifth possible implementation of the fifth aspect, the sixth possible implementation of the fifth aspect, the seventh possible implementation of the fifth aspect, the eighth possible implementation of the fifth aspect, the ninth possible implementation of the fifth aspect, the tenth possible implementation of the fifth aspect, or the eleventh possible implementation of the fifth aspect, in a twelfth possible implementation, the processor is further configured to:

when the SNR value of the user equipment is greater than or greater than or equal to the preset first threshold and less than or not greater than a preset third threshold, update a retransmission quantity configured for the user equipment, and use the updated retransmission quantity to perform downlink transmission for the user equipment, where the updated retransmission quantity is greater than the preset retransmission quantity.

According to a sixth aspect, user equipment is provided, including:

a receiver, configured to receive first signaling that is sent by a base station and that is used to determine a feedback manner of hybrid automatic repeat request HARQ feedback information of the user equipment, where the feedback manner includes: feeding back the HARQ feedback information, or skipping feeding back the HARQ feedback information; and the first signaling implicitly indicates the feedback manner of the HARQ feedback information; and a processor, configured to determine the feedback manner of the HARQ feedback information according to the first signaling.

With reference to the sixth aspect, in a first possible implementation, the first signaling is radio resource control RRC signaling, Media Access Control MAC signaling, or physical layer signaling.

With reference to the sixth aspect or the first possible implementation of the sixth aspect, in a second possible implementation, the first signaling is modulation and coding scheme MCS indication information, and the MCS indication information indicates an MCS index value or a transport block size TBS index value corresponding to an MCS index value; and that the processor determines the feedback manner of the HARQ feedback information according to the first signaling includes:

when the MCS index value or the TBS index value indicated by the MCS indication information is not greater than a preset second threshold, determining not to feed back the HARQ feedback information; or when the MCS index value or the TBS index value indicated by the MCS indication information is greater than a preset second threshold, determining, by the user equipment, to feed back the HARQ feedback information.

With reference to the sixth aspect or the first possible implementation of the sixth aspect, in a third possible implementation, the first signaling is channel state information CSI configuration information, and the CSI configuration information is CQI table configuration information and/or MCS table configuration information; and that the processor determines the feedback manner of the HARQ feedback information according to the first signaling includes:

when the CSI configuration information indicates that the user equipment uses a CQI table and/or an MCS table that do/does not include 256QAM, determining not to feed back the HARQ feedback information; or when the CSI configuration information indicates that the user equipment uses a CQI table and/or an MCS table that include/includes 256QAM, determining to feed back the HARQ feedback information.

With reference to the sixth aspect or the first possible implementation of the sixth aspect, in a fourth possible implementation, the first signaling is transmission time interval TTI frame structure configuration information; and that the processor determines the feedback manner of the HARQ feedback information according to the first signaling includes:

when the TTI frame structure configuration information indicates a shortest TTI frame structure in at least two preset TTI frame structures of different lengths, determining not to feed back the HARQ feedback information; or when the TTI frame structure configuration information indicates a TTI frame structure that is not the shortest in at least two preset TTI frame structures of different lengths, determining to feed back the HARQ feedback information.

With reference to the sixth aspect or the first possible implementation of the sixth aspect, in a fifth possible implementation, the first signaling is repetition quantity information; and that the processor determines the feedback manner of the HARQ feedback information according to the first signaling includes:

when the repetition quantity information indicates that a quantity of times that a same transport data block is retransmitted is greater than 1, determining not to feed back the HARQ feedback information; or when the repetition quantity information indicates that a quantity of times that a same transport data block is retransmitted is not greater than 1, determining to feed back the HARQ feedback information.

According to a seventh aspect, an information processing system is provided, including a base station and user equipment, where:

the base station is configured to: determine a feedback manner of hybrid automatic repeat request HARQ feedback information of the user equipment; determine first signaling according to the feedback manner of the HARQ feedback information; and send the first signaling to the user equipment, where the first signaling implicitly indicates the feedback manner of the HARQ feedback information; the feedback manner includes: feeding back the HARQ feedback information, or skipping feeding back the HARQ feedback information; and the user equipment is configured to: receive the first signaling sent by the base station, and determine the feedback manner of the HARQ feedback information according to the first signaling.

In the embodiments of the present disclosure, the base station determines the feedback manner of the HARQ feedback information of the user equipment, and sends the first signaling to the user equipment, so that the user equipment determines the feedback manner of the HARQ feedback information according to the first signaling. The feedback manner includes: feeding back the HARQ feedback information, or skipping feeding back the HARQ feedback information. In this way, when the user equipment determines not to feed back the HARQ feedback information, and the user equipment and the base station perform data transmission, the user equipment does not send ACK/NACK to the base station, so that the base station reduces erroneous detection, thereby reducing damage caused by uplink HARQ feedback information to network performance.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

To resolve a prior-art problem that HARQ feedback information causes relatively great damage to network performance, embodiments of the present disclosure provide an information processing solution. A core idea of the information processing solution is that a base station determines a feedback manner of HARQ feedback information of user equipment, and sends first signaling to the user equipment, so that the user equipment determines the feedback manner of the HARQ feedback information according to the first signaling, where the feedback manner includes: feeding back the HARQ feedback information, or skipping feeding back the HARQ feedback information. In this way, when the user equipment determines not to feedback the HARQ feedback information, and the user equipment and the base station perform data transmission, the user equipment does not send ACK/NACK to the base station, so that the base station avoids performing erroneous detection, thereby reducing damage caused by uplink HARQ feedback information to network performance.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure. Reference may be made to each other in the following embodiments if they are not mutually exclusive.

It should also be noted that in the embodiments of the present disclosure, the user equipment (UE) may be referred to as a terminal, a mobile station (MS), a mobile terminal, and the like. The user equipment may communicate with one or more core networks through a radio access network (RAN). For example, the user equipment may be a mobile phone (or referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

In the embodiments of the present disclosure, the base station may be an evolved NodeB (eNB, or e-NodeB) in an LTE system, a macro base station, a micro base station (also referred to as a "small cell"), a picocell base station, an access point (AP), or a transmission point (TP). This is not limited in the present disclosure. However, for ease of description, the following embodiments are described by using the base station and the user equipment as examples.

Figure 1:
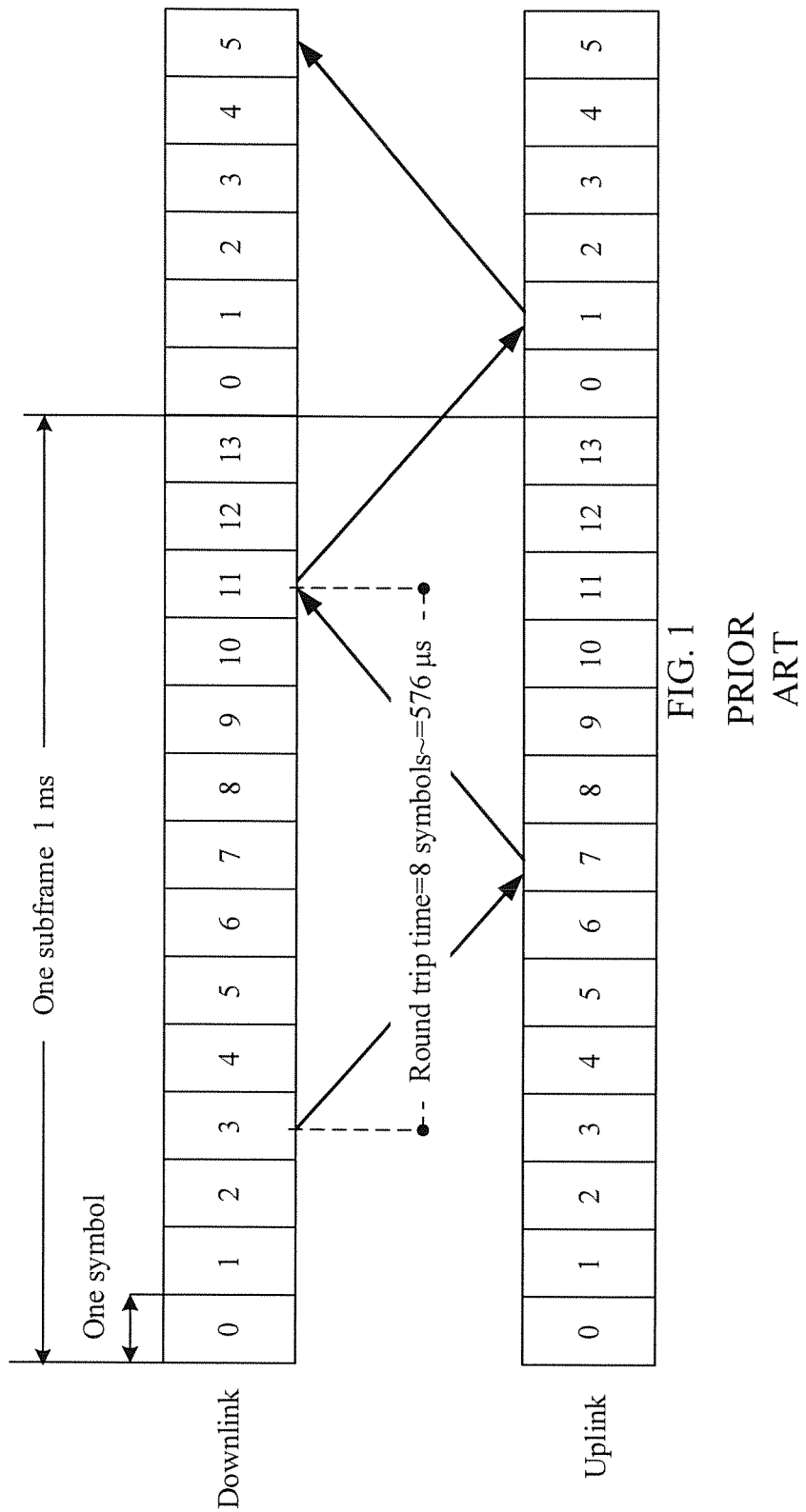
FIG. 1 is a delay diagram of an RTT for transmitting data on one symbol in the prior art.
Figure 2:
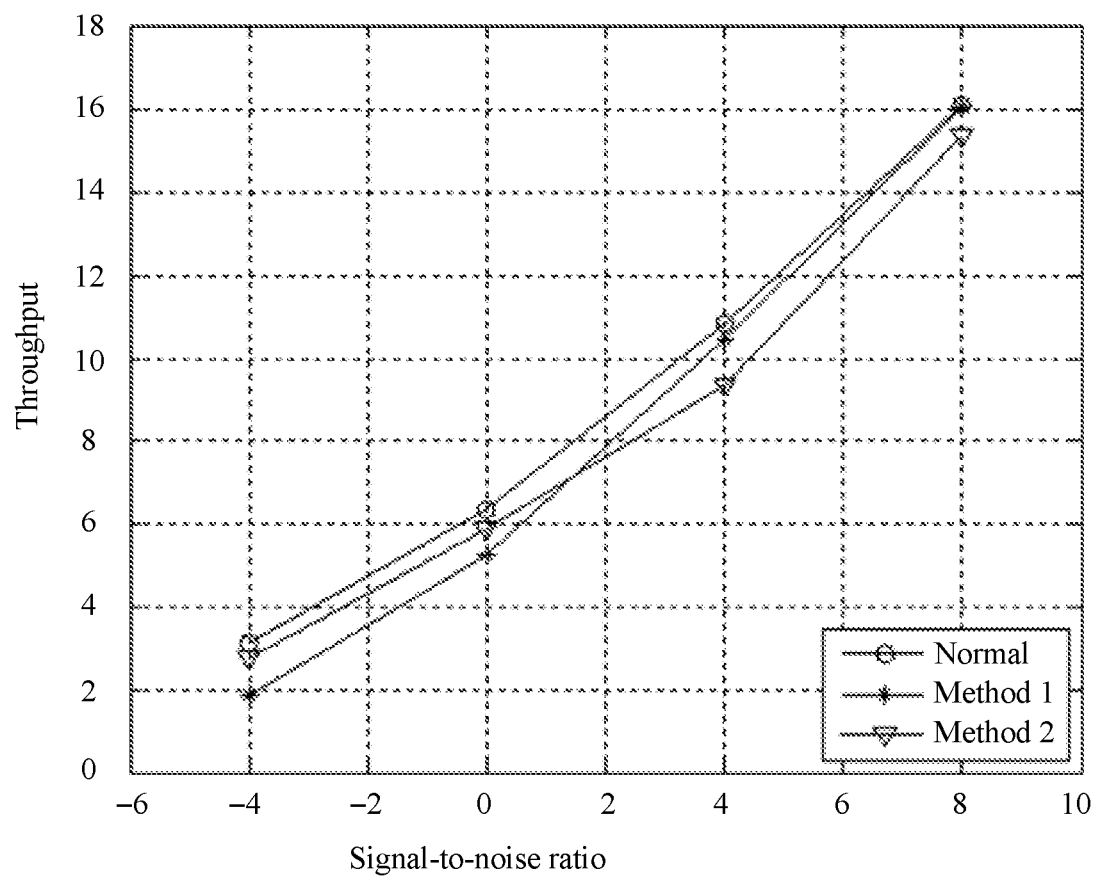
FIG. 2 is a link simulation result diagram of impact of uplink ACK feedback in a TTI of one symbol on downlink PDSCH transmission performance in a TTI of one symbol.

As shown in FIG. 2, FIG. 2 is a link simulation result diagram of impact of uplink ACK feedback in a TTI of one symbol on downlink physical downlink shared channel (PDSCH) transmission performance in a TTI of one symbol. A lateral axis coordinate is a signal-to-noise ratio (SNR) of UE, and a longitudinal axis coordinate is a throughput of the UE. FIG. 2 shows simulation of downlink data in three different scenarios; that is, an eNB transmits the downlink data to the UE.

Referring to FIG. 2:

A curve normal is a statistical curve of the throughput of the UE in a first assumption.

The first assumption is:

There is normal adaptive modulation and coding (AMC). That is, a modulation and coding scheme (MCS) is selected for downlink data transmission for the UE by assuming that a target block error rate (BLER) of first transmission is 0.1. During downlink data transmission for the UE, if the first transmission fails in demodulation, the base station may perform retransmission, and a data packet is allowed to be transmitted for a maximum of four times. ACK feedback is ideal ACK feedback (that is, the UE receives the downlink data sent by the eNB, and the base station does not falsely detect ACK/NACK fed back to the eNB after demodulation and decoding).

A curve method 1 is a statistical curve of the throughput of the UE in a second assumption.

Figure 3:
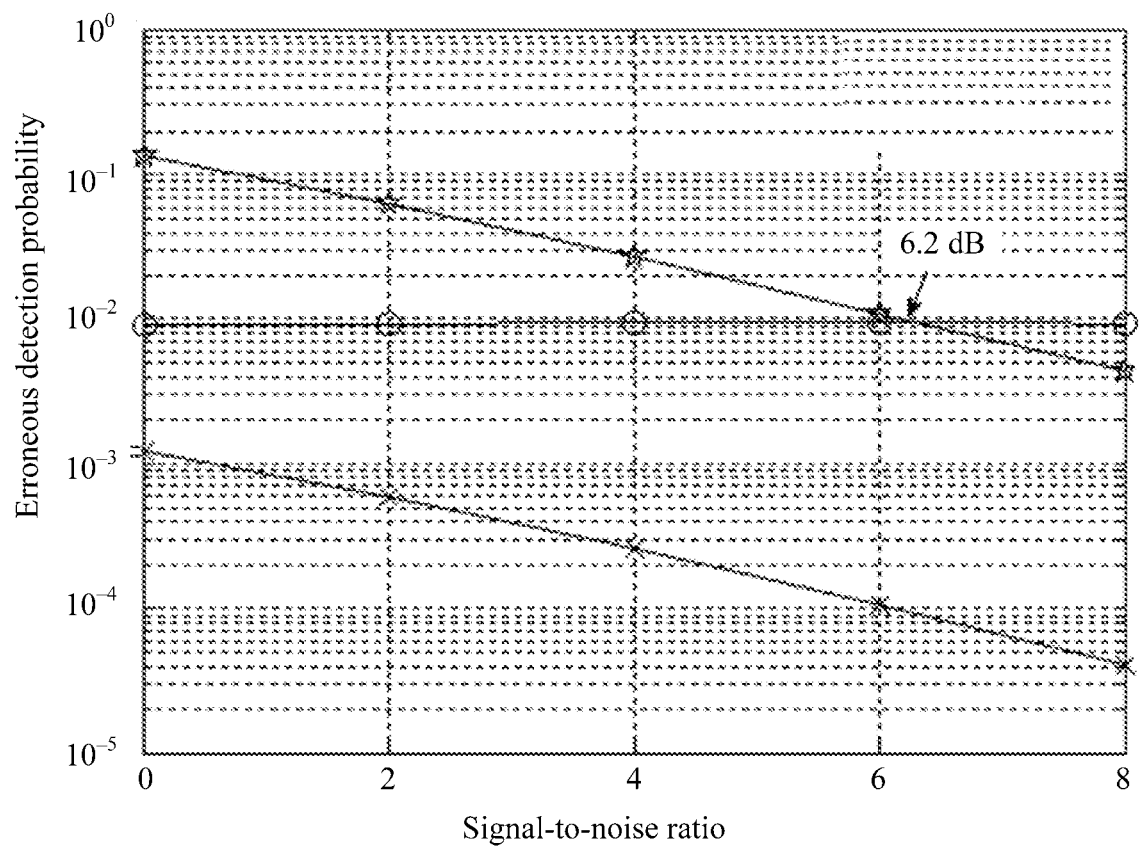
FIG. 3 is a performance curve of ACK transmission in a TTI of one symbol.

The second assumption is:

There is normal AMC. A data packet is allowed to be transmitted for a maximum of twenty times. ACK feedback is non-ideal (that is, the UE receives the downlink data sent by the eNB, and the base station falsely detects ACK/NACK fed back to the eNB after demodulation and decoding, for example, the base station falsely detects some ACKs fed back by the UE as NACKs. Modeling of non-ideal ACK feedback is related to a performance curve of ACK transmission in a TTI of one symbol. As shown in FIG. 3, FIG. 3 is the performance curve of the ACK transmission in a TTI of one symbol. A lateral axis coordinate is an SNR of the UE, and a longitudinal axis coordinate is an erroneous detection probability of ACK. There are three curves in FIG. 3. A curve corresponding to "☆" is a probability curve of a case in which the user equipment sends ACK, but the base station does not detect the ACK. A curve corresponding to "0" is a probability curve of a case in which the user equipment sends ACK, but the base station detects NACK. A curve corresponding to "X" is a probability curve of a case in which the user equipment sends NACK, but the base station detects ACK. Referring to the curve corresponding to "☆", when it is assumed that there is a false alarm, the erroneous detection probability of ACK during ACK feedback in a TTI of one symbol is 0.15 when the SNR is 0 dB; the erroneous detection probability of ACK is 0.065 when the SNR is 2 dB; the erroneous detection probability of ACK is 0.03 when the SNR is 4 dB; and the erroneous detection probability of ACK is 0.013 when the SNR is 6 dB. For example, it is assumed that there is a false alarm, and the erroneous detection probability of ACK during ACK feedback in a TTI of one symbol is 0.065 when the SNR is 2 dB. When the SNR is 2 dB and the base station receives ACK fed back by the UE, a probability that the base station does not correctly detect the ACK is 0.065. When the base station performs erroneous detection, even if the UE has correctly decoded a data packet during last transmission, the base station still retransmits the data packet.

A curve method 2 is a statistical curve of the throughput of the UE in a third assumption.

The third assumption is:

There is conservative AMC (that is, an MCS is selected for downlink data transmission for the UE by assuming that a target block error rate of first transmission is less than 0.1. In a specific implementation, a threshold for selecting the MCS may be increased by 2 dB, or data scheduling may be performed after a level of a selected MCS is reduced). There is no retransmission (because a BLER of initial transmission is relatively low, and the base station may assume that the UE can perform correct decoding during the first transmission). ACK feedback is ideal ACK feedback.

It may be learned from the foregoing simulation result that the curve normal is almost an outer curve envelope of the curve method 1 and the curve method 2.

Therefore, according to the foregoing simulation result diagram, when the SNR is low (for example, less than 2 dB), the user equipment may not feed back HARQ feedback information, so as to reduce damage caused by erroneous detection of uplink HARQ feedback information to network performance; when the SNR is medium (for example, 2-8 dB), a relatively large retransmission quantity may be configured, and damage caused by erroneous detection of uplink HARQ feedback information to network performance may be reduced by using a HARQ gain; or when the SNR is high (for example, greater than 8 dB), because performance of uplink HARQ feedback information may be ensured in this case, additional processing may not be performed.

Figure 4:
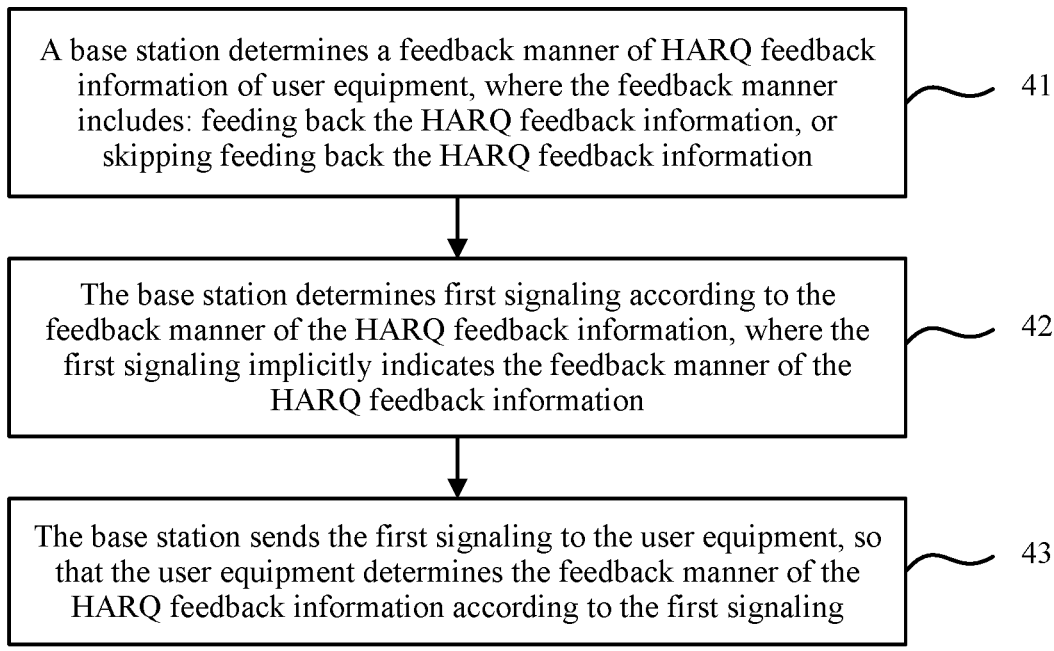
FIG. 4 is a flowchart of implementing an information processing method implemented on a base station side according to an embodiment of the present disclosure.

Based on the foregoing analysis, an embodiment of the present disclosure provides an information processing method implemented on a base station side. As shown in FIG. 4, FIG. 4 is a flowchart of implementing the method. The method includes the following steps.

Step 41: A base station determines a feedback manner of HARQ feedback information of user equipment, where the feedback manner includes: feeding back the HARQ feedback information, or skipping feeding back the HARQ feedback information.

Optionally, step 41 may be implemented in the following manner:

The base station determines an SNR value of the user equipment.

Optionally, the SNR value is an SNR value of a channel on which the user equipment receives downlink data. The base station may determine the SNR value of the user equipment according to a channel quality indicator (CQI) reported by the user equipment. Optionally, the SNR value is an SNR value of a channel on which the user equipment sends uplink data. The base station may determine the SNR value of the user equipment according to an uplink reference signal (for example, a sounding reference signal (SRS) and/or a demodulation reference signal (DMRS)) sent by the user equipment.

When the SNR value of the user equipment is less than or not greater than a preset first threshold, the base station determines that the user equipment does not feed back the HARQ feedback information; or when the SNR value of the user equipment is greater than or not less than a preset first threshold, the base station determines that the user equipment feeds back the HARQ feedback information.

That is, when the SNR value of the user equipment is less than the first threshold, the base station determines that the user equipment does not feed back the HARQ feedback information; or when the SNR value of the user equipment is not less than the first threshold, the base station determines that the user equipment feeds back the HARQ feedback information.

Alternatively, when the SNR value of the user equipment is not greater than the first threshold, the base station determines that the user equipment does not feed back the HARQ feedback information; or when the SNR value of the user equipment is greater than the first threshold, the base station determines that the user equipment feeds back the HARQ feedback information.

Optionally, when the SNR value of the user equipment is greater than or not less than the preset first threshold and less than or not greater than a preset third threshold, the base station may update a retransmission quantity configured for the user equipment, and use the updated retransmission quantity to perform downlink PDSCH transmission for the user equipment, where the updated retransmission quantity is greater than the preset retransmission quantity.

Optionally, according to the simulation result in FIG. 2, in this embodiment of the present disclosure, the first threshold may be 2 dB, and the third threshold may be 8 dB.

Step 42: The base station determines first signaling according to the feedback manner of the HARQ feedback information, where the first signaling implicitly indicates the feedback manner of the HARQ feedback information.

That is, in this embodiment of the present disclosure, the first signaling does not directly indicate the feedback manner of the HARQ feedback information.

Optionally, the first signaling may be radio resource control (RRC) signaling, Media Access Control (MAC) signaling, or physical layer signaling.

Optionally, the first signaling may be MCS indication information, and the MCS indication information may indicate an MCS index value or a transport block size (TBS) index value corresponding to an MCS index value; and step 42 may specifically include:

when the feedback manner of the HARQ feedback information is skipping feeding back the HARQ feedback information, determining, by the base station, the MCS indication information, where the MCS index value or the TBS index value indicated by the MCS indication information is not greater than a preset second threshold.

Optionally, in this case, the TBS index value indicated by the MCS indication information determined by the base station is determined according to a target value of a block error rate (BLER), and the target value of the BLER is less than 0.1. The target value of the BLER is modified to be less than 0.1, so that an initial transmission success rate is increased, and the UE does not feedback the HARQ feedback information.

When the feedback manner of the HARQ feedback information is feeding back the HARQ feedback information, the base station determines the MCS indication information, where the MCS index value or the TBS index value indicated by the MCS indication information is greater than a second threshold.

In addition, in this embodiment of the present disclosure, step 42 may be implemented in the following manner:

When the feedback manner of the HARQ feedback information is skipping feeding back the HARQ feedback information, the base station determines the MCS indication information, where the MCS index value or the TBS index value indicated by the MCS indication information is less than a preset second threshold; or when the feedback manner of the HARQ feedback information is feeding back the HARQ feedback information, the base station determines the MCS indication information, where the MCS index value or the TBS index value indicated by the MCS indication information is not less than a second threshold.

Optionally, alternatively, the first signaling may be channel state information (CSI) configuration information, and the CSI configuration information is CQI table configuration information and/or modulation and coding scheme MCS table configuration information; and step 42 may specifically include:

when the feedback manner of the HARQ feedback information is skipping feeding back the HARQ feedback information, determining, by the base station, CSI configuration information that is used to indicate that the user equipment uses a CQI table and/or an MCS table that do/does not include 256QAM; or when the feedback manner of the HARQ feedback information is feeding back the HARQ feedback information, determining, by the base station, CSI configuration information that is used to indicate that the user equipment uses a CQI table and/or an MCS table that include/includes 256QAM.

Optionally, in this case, before the base station determines the first signaling according to the feedback manner of the HARQ feedback information, the method may further include:

when the feedback manner of the HARQ feedback information is skipping feeding back the HARQ feedback information, configuring, for the user equipment, the CQI table and/or the MCS table that do/does not include the 256QAM; or when the feedback manner of the HARQ feedback information is feeding back the HARQ feedback information, configuring, for the user equipment, the CQI table and/or the MCS table that include/includes the 256QAM.

Optionally, alternatively, the first signaling may be TTI frame structure configuration information;

the TTI frame structure configuration information may be frame structure configuration information required by the user equipment to receive downlink data and/or frame structure configuration information required by the user equipment to send uplink data; and step 42 may specifically include:

when the feedback manner of the HARQ feedback information is skipping feeding back the HARQ feedback information, determining, by the base station, TTI frame structure configuration information that is used to indicate that the user equipment uses a shortest TTI frame structure in at least two preset different TTI frame structures for data transmission; or when the feedback manner of the HARQ feedback information is feeding back the HARQ feedback information, determining, by the base station, TTI frame structure configuration information that is used to indicate that the user equipment uses, for data transmission, a TTI frame structure that is not the shortest in at least two different TTI frame structures.

Optionally, in this case, before the base station determines the first signaling according to the feedback manner of the HARQ feedback information, the method may further include:

when the feedback manner of the HARQ feedback information is skipping feeding back the HARQ feedback information, configuring, for the user equipment, a shortest TTI frame structure in the at least two TTI frame structures of different lengths; or when the feedback manner of the HARQ feedback information is feeding back the HARQ feedback information, configuring, for the user equipment, a TTI frame structure that is not the shortest in the at least two TTI frame structures of different lengths.

Optionally, alternatively, the first signaling may be repetition quantity information; and step 42 may specifically include:

when the feedback manner of the HARQ feedback information is skipping feeding back the HARQ feedback information, determining, by the base station, repetition quantity information that is used to indicate that a quantity of times that a same transport data block is retransmitted is greater than 1; or when the feedback manner of the HARQ feedback information is feeding back the HARQ feedback information, determining, by the base station, repetition quantity information that is used to indicate that a quantity of times that a same transport data block is retransmitted is not greater than 1.

Optionally, in this case, before the base station determines the first signaling according to the feedback manner of the HARQ feedback information, the method further includes:

when the feedback manner of the HARQ feedback information is skipping feeding back the HARQ feedback information, configuring, by the base station for the user equipment, transmission that a quantity of times that a same transport data block is retransmitted is greater than 1, where resources that are consecutive in terms of time and/or frequency or resources that are inconsecutive in terms of time and/or frequency are used for the transmission that the quantity of times that a same transport data block is retransmitted is greater than 1. Optionally, the resources that are consecutive in terms of time and/or frequency or the resources that are inconsecutive in terms of time and/or frequency are predefined by the base station.

In step 42, optionally, the first signaling is determined according to each user equipment.

In step 42, optionally, the first signaling is determined according to each resource group. Specifically, the resource group may be a subframe, a subframe set, a carrier, a carrier set, a resource block (RB), a resource block set, a CSI process or a CSI process set, a channel state information-reference signal (CSI-RS), a CSI-RS set, an access point, an access point set, or the like. Specifically, the carrier may be a component carrier (CC), and the access point may be a base station corresponding to a cell, a remote radio unit (RRU), a remote radio head (RRH), a macro cell, a small cell, a micro cell, a home NodeB, or the like.

Step 43: The base station sends the first signaling to the user equipment, so that the user equipment determines the feedback manner of the HARQ feedback information according to the first signaling.

If the first signaling is determined according to each user equipment, when the base station sends the first signaling to the user equipment, the base station may separately send the determined first signaling to each user equipment. If the first signaling is determined according to each resource group, when the base station sends the first signaling to the user equipment, the base station may separately send the determined first signaling to each user equipment, or may send the determined first signaling to all user equipments by using a common channel.

In this embodiment of the present disclosure, the base station determines the feedback manner of the HARQ feedback information of the user equipment, and sends the first signaling to the user equipment, so that the user equipment determines the feedback manner of the HARQ feedback information according to the first signaling, where the feedback manner includes: feeding back the HARQ feedback information, or skipping feeding back the HARQ feedback information. In this way, when the user equipment determines not to feed back the HARQ feedback information, and the user equipment and the base station perform data transmission, the user equipment does not send ACK/NACK to the base station, so that the base station avoids performing erroneous detection, thereby reducing damage caused by uplink HARQ feedback information to network performance.

Figure 5:
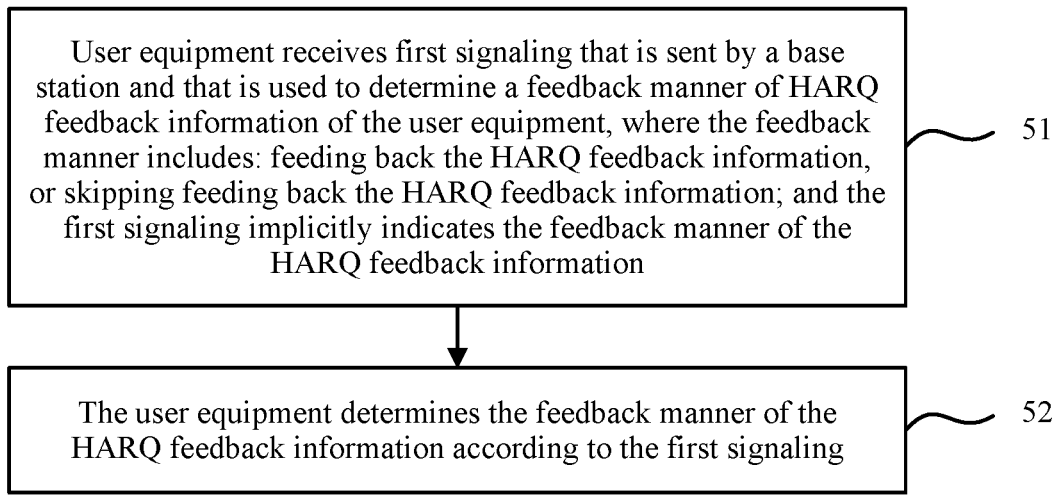
FIG. 5 is a flowchart of implementing an information processing method implemented on a user equipment side according to an embodiment of the present disclosure.

Correspondingly, an embodiment of the present disclosure further provides an information processing method implemented on a user equipment side. As shown in FIG. 5, FIG. 5 is a flowchart of implementing the method. The method includes the following steps.

Step 51: User equipment receives first signaling that is sent by a base station and that is used to determine a feedback manner of HARQ feedback information of the user equipment, where the feedback manner includes: feeding back the HARQ feedback information, or skipping feeding back the HARQ feedback information; and the first signaling implicitly indicates the feedback manner of the HARQ feedback information.

Optionally, the first signaling may be RRC signaling, MAC signaling, or physical layer signaling.

Step 52: The user equipment determines the feedback manner of the HARQ feedback information according to the first signaling.

Optionally, the first signaling may be MCS indication information; and step 52 may specifically include:

when an MCS index value or a TBS index value indicated by the MCS indication information is not greater than a preset second threshold, determining, by the user equipment, not to feed back the HARQ feedback information; or when an MCS index value or a TBS index value indicated by the MCS indication information is greater than a preset second threshold, determining, by the user equipment, to feed back the HARQ feedback information.

Alternatively, when an MCS index value or a TBS index value indicated by the MCS indication information is less than a preset second threshold, the user equipment determines not to feed back the HARQ feedback information; or when an MCS index value or a TBS index value indicated by the MCS indication information is not less than a preset second threshold, the user equipment determines to feedback the HARQ feedback information.

Optionally, alternatively, the first signaling may be CSI configuration information, and the CSI configuration information is CQI table configuration information and/or MCS table configuration information; and step 52 may specifically include:

when the CSI configuration information indicates that the user equipment uses a CQI table and/or an MCS table that do/does not include 256QAM, determining, by the user equipment, not to feedback the HARQ feedback information; or when the CSI configuration information indicates that the user equipment uses a CQI table and/or an MCS table that include/includes 256QAM, determining, by the user equipment, to feed back the HARQ feedback information.

Optionally, alternatively, the first signaling may be TTI frame structure configuration information;

the TTI frame structure configuration information may be frame structure configuration information required by the user equipment to receive downlink data and/or frame structure configuration information required by the user equipment to send uplink data; and step 52 may specifically include:

when the TTI frame structure configuration information indicates that the user equipment uses a shortest TTI frame structure in at least two preset TTI frame structures of different lengths for data transmission, determining, by the user equipment, not to feed back the HARQ feedback information; or when the TTI frame structure configuration information indicates a TTI frame structure that is not the shortest in at least two preset TTI frame structures of different lengths, determining, by the user equipment, to feed back the HARQ feedback information.

Optionally, alternatively, the first signaling may be repetition quantity information; and step 52 may specifically include:

when the repetition quantity information indicates that a quantity of times that a same transport data block is retransmitted is greater than 1, determining, by the user equipment, not to feed back the HARQ feedback information; or when the repetition quantity information indicates that a quantity of times that a same transport data block is retransmitted is not greater than 1, determining, by the user equipment, to feed back the HARQ feedback information.

In this embodiment of the present disclosure, the user equipment receives the first signaling that is sent by the base station and that is used to determine the feedback manner of the HARQ feedback information of the user equipment, and determines the feedback manner of the HARQ feedback information according to the first signaling, where the feedback manner includes: feeding back the HARQ feedback information, or skipping feeding back the HARQ feedback information. In this way, when the user equipment determines not to feed back the HARQ feedback information, and the user equipment and the base station perform data transmission, the user equipment does not send ACK/NACK to the base station, so that the base station avoids performing erroneous detection, thereby reducing damage caused by uplink HARQ feedback information to network performance.

Based on the foregoing disclosure principle, the following describes in detail an implementation process of the information processing method provided in the embodiments of the present disclosure in actual application.

Embodiment 1

When first signaling is MCS indication information, there may be specifically the following two cases:

Case 1:

A base station presets a second threshold. When an MCS index value or a TBS index value indicated by MCS indication information sent by the base station to user equipment is not greater than the second threshold, the MCS indication information implicitly indicates that the user equipment does not perform HARQ feedback on a data packet corresponding to the MCS index value or the TBS index value; or when an MCS index value or a TBS index value indicated by MCS indication information sent by the base station to user equipment is greater than the second threshold, the MCS indication information implicitly indicates that the user equipment performs HARQ feedback on a data packet corresponding to the MCS index value or the TBS index value.

Specifically, the base station determines an uplink SNR value of the user equipment according to an uplink reference signal sent by the user equipment, for example, an SRS and/or a DMRS. When the uplink SNR value of the user equipment is less than or not greater than a first threshold, the base station performs conservative scheduling on downlink data transmission for the user equipment. For example, it is assumed that the base station determines, according to a CQI reported by the user equipment, that an MCS index value that should be used for downlink data transmission for the user equipment is j. The base station reduces a level of the MCS index value, and learns that the MCS index value is (j−k), where k is equal to 1 or 2. When (j−k) or a TBS index value indicated by (j−k) is greater than the second threshold, the base station schedules downlink data transmission for the user equipment by using a maximum MCS index value that implicitly indicates that the user equipment does not perform HARQ feedback; or when (j−k) or a TBS index value indicated by (j−k) is not greater than the second threshold, the base station schedules downlink data transmission for the user equipment by using the MCS index value (j−k). By means of conservative scheduling, the base station gives up retransmission during downlink data transmission for the user equipment. By increasing an initial transmission success rate, the base station may assume that the user equipment correctly receives downlink data, and does not need to perform uplink HARQ feedback, so as to reduce damage caused by uplink HARQ feedback information to network performance.

Case 2:

In an existing LTE system, a CQI table is created by assuming that a target BLER is 0.1. In Case 2, MCS indication information sent by a base station to user equipment is determined according to a preset CQI table and/or a preset MCS table. In the preset CQI table and/or the preset MCS table, a relatively low target BLER is set in an area in which an SNR is low, for example, 0.01, and the original target BLER (that is, 0.1) remains unchanged in an area in which an SNR is medium or high. When the MCS indication information sent by the base station to the user equipment or an MCS level indicated by the MCS indication information is corresponding to a relatively low target BLER, the MCS indication information implicitly indicates that the user equipment does not perform HARQ feedback on a data packet corresponding to the MCS; or when the MCS indication information sent by the base station to the user equipment or an MCS level indicated by the MCS indication information is corresponding to a medium target BLER or a high target BLER, the MCS indication information implicitly indicates that the user equipment performs HARQ feedback on a data packet corresponding to the MCS.

A CQI table is given in the following Table 1. It should be noted that an SNR value corresponding to a switching point of different target BLERs in the following CQI table may be determined according to a simulation result. In this embodiment of the present disclosure, a switching point is 1-3 dB according to the simulation result in FIG. 2.

In addition, an SNR range, a target BLER, and ACK feedback in the following Table 1 and Table 2 may be optional columns of the tables.

TABLE 1

| CQI index | Modulation | Code rate × 1024 | Efficiency | SNR range | Target BLER |
|---|---|---|---|---|---|
| 0 | Out of range | | | | |
| 1 | QPSK | 78 | 0.1523 | −7 | 0.01 |
| 2 | QPSK | 120 | 0.2344 | −5.1080 | 0.01 |
| 3 | QPSK | 193 | 0.3770 | −3.2160 | 0.01 |
| 4 | QPSK | 308 | 0.6016 | −1.3240 | 0.01 |
| 5 | QPSK | 449 | 0.8770 | 0.5680 | 0.01 |
| 6 | QPSK | 602 | 1.1758 | 2.4600 | 0.01 |
| 7 | 16QAM | 378 | 1.4766 | 4.3520 | 0.1 |
| 8 | 16QAM | 490 | 1.9141 | 6.2440 | 0.1 |
| 9 | 16QAM | 616 | 2.4063 | 8.1360 | 0.1 |
| 10 | 64QAM | 466 | 2.7305 | 10.0280 | 0.1 |
| 11 | 64QAM | 567 | 3.3223 | 11.9200 | 0.1 |
| 12 | 64QAM | 666 | 3.9023 | 13.8120 | 0.1 |
| 13 | 64QAM | 772 | 4.5234 | 15.7040 | 0.1 |
| 14 | 64QAM | 873 | 5.1152 | 17.5960 | 0.1 |
| 15 | 64QAM | 948 | 5.5547 | 19.4880 | 0.1 |

Correspondingly, an MCS table may be determined according to a CQI table. The MCS table that is determined according to the CQI table in Table 1 is given in Table 2. When the base station schedules the user equipment, a target BLER value corresponding to an MCS index used by the base station implicitly indicates whether the user equipment needs to feed back HARQ feedback information. For example, in Table 2, when the MCS index is not greater than 8, the HARQ feedback information is not fed back.

TABLE 2

| MCS index $I_{MCS}$ | Modulation order $Q_m$ | TBS index $I_{TBS}$ | CQI index | SNR range | Target BLER | ACK feedback |
|---|---|---|---|---|---|---|
| 0 | 2 | 0 | 2 | −5.1080 | 0.01 | No |
| 1 | 2 | 1 | | | 0.01 | No |
| 2 | 2 | 2 | 3 | −3.2160 | 0.01 | No |
| 3 | 2 | 3 | | | 0.01 | No |
| 4 | 2 | 4 | 4 | −1.3240 | 0.01 | No |
| 5 | 2 | 5 | | | 0.01 | No |
| 6 | 2 | 6 | 5 | 0.5680 | 0.01 | No |
| 7 | 2 | 7 | | | 0.01 | No |
| 8 | 2 | 8 | 6 | 2.4600 | 0.01 | No |
| 9 | 2 | 9 | | | 0.1 | Yes |
| 10 | 4 | 9 | | | 0.1 | Yes |
| 11 | 4 | 10 | 7 | 4.3520 | 0.1 | Yes |
| 12 | 4 | 11 | | | 0.1 | Yes |
| 13 | 4 | 12 | 8 | 6.2440 | 0.1 | Yes |
| 14 | 4 | 13 | | | 0.1 | Yes |
| 15 | 4 | 14 | 9 | 8.1360 | 0.1 | Yes |
| 16 | 4 | 15 | | | 0.1 | Yes |
| 17 | 6 | 15 | | | 0.1 | Yes |
| 18 | 6 | 16 | 10 | 10.0280 | 0.1 | Yes |
| 19 | 6 | 17 | | | 0.1 | Yes |
| 20 | 6 | 18 | 11 | 11.9200 | 0.1 | Yes |
| 21 | 6 | 19 | | | 0.1 | Yes |
| 22 | 6 | 20 | 12 | 13.8120 | 0.1 | Yes |
| 23 | 6 | 21 | | | 0.1 | Yes |
| 24 | 6 | 22 | 13 | 15.7040 | 0.1 | Yes |
| 25 | 6 | 23 | | | 0.1 | Yes |
| 26 | 6 | 24 | 14 | 17.5960 | 0.1 | Yes |
| 27 | 6 | 25 | | | 0.1 | Yes |
| 28 | 6 | 26 | 15 | 19.4880 | 0.1 | Yes |
| 29 | 2 | Reserved | | | | |
| 30 | 4 | | | | | |
| 31 | 6 | | | | | |

Specifically, the base station determines, according to a CQI reported by the user equipment, a downlink SNR value of the user equipment, and/or determines an uplink SNR value of the user equipment according to an uplink reference signal sent by the user equipment, for example, an SRS and/or a DMRS. When at least one of the foregoing SNR values of the user equipment is less than or not greater than a first threshold, the base station performs conservative scheduling on downlink data transmission for the user equipment. For example, in Table 2, the base station schedules downlink data transmission for the user equipment by using an MCS index value or a TBS index value that is not greater than 8. By means of conservative scheduling, the base station gives up retransmission during downlink data transmission for the user equipment. By increasing an initial transmission success rate, the base station may assume that the user equipment correctly receives downlink data, and does not need to perform uplink HARQ feedback, so as to reduce damage caused by uplink HARQ feedback information to network performance.

Embodiment 2

When first signaling is CSI configuration information, the CSI configuration information may be CQI table configuration information, may be MCS table configuration information, or may be CQI table configuration information and MCS table configuration information. There may be specifically the following two cases:

Case 1:

Specifically, a base station determines, according to a CQI reported by user equipment, a downlink SNR value of the user equipment, and/or determines an uplink SNR value of user equipment according to an uplink reference signal sent by the user equipment, for example, an SRS and/or a DMRS. When the base station determines that at least one of the foregoing SNR values of the user equipment is less than or not greater than a first threshold, the base station determines that the user equipment does not feedback HARQ feedback information, and configures, for the user equipment, a CQI table and/or an MCS table that do/does not include 256QAM; or when the base station determines that at least one of the foregoing SNR values of the user equipment is greater than or not less than a first threshold, the base station determines that the user equipment feeds back HARQ feedback information, and configures, for the user equipment, a CQI table and/or an MCS table that include/includes 256QAM. Then, the base station sends the CSI configuration information to the user equipment, so that the user equipment determines a feedback manner of the HARQ feedback information according to the CSI configuration information. When the CSI configuration information indicates that the user equipment uses the CQI table and/or the MCS table that do/does not include 256QAM, the user equipment determines not to feed back the HARQ feedback information; or when the CSI configuration information indicates that the user equipment uses the CQI table and/or the MCS table that include/includes 256QAM, the user equipment determines to feed back the HARQ feedback information.

By using this manner, the base station gives up retransmission during downlink data transmission for user equipment with a low SNR. By increasing an initial transmission success rate, the base station may assume that the user equipment correctly receives downlink data, and does not need to perform uplink HARQ feedback, so as to reduce damage caused by uplink HARQ feedback information to network performance.

An LTE standard is used as an example. The following Table 3 is an existing CQI table that does not include 256QAM; Table 4 is an existing CQI table that includes 256QAM; Table 5 is an existing MCS table that does not include 256QAM; and Table 6 is an existing MCS table that includes 256QAM.

TABLE 3

| CQI index | Modulation | Code rate × 1024 | Efficiency |
|---|---|---|---|
| 0 | Out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 4

| CQI index | Modulation | Code rate × 1024 | Efficiency |
|---|---|---|---|
| 0 | Out of range | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

TABLE 5

| MCS index $I_{MCS}$ | Modulation order $Q_m$ | TBS index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | |
| 31 | 6 | |

TABLE 6

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 8 | 25 |
| 21 | 8 | 27 |
| 22 | 8 | 28 |
| 23 | 8 | 29 |
| 24 | 8 | 30 |
| 25 | 8 | 31 |
| 26 | 8 | 32 |
| 27 | 8 | 33 |
| 28 | 2 | Reserved |
| 29 | 4 | |
| 30 | 6 | |
| 31 | 8 | |

Case 2:

When a CQI table and/or an MCS table are/is designed, at least two sets of CQI tables and/or MCS tables may be designed according to different target BLERs. For example, the CQI table and/or the MCS table are/is separately designed according to a target BLER value 0.1 in an existing LTE system and a BLER value, for example, 0.01 that is less than the existing target BLER value.

Specifically, a base station determines, according to a CQI reported by user equipment, a downlink SNR value of the user equipment, and/or determines an uplink SNR value of user equipment according to an uplink reference signal sent by the user equipment, for example, an SRS and/or a DMRS. When the base station determines that at least one of the foregoing SNR values of the user equipment is less than or not greater than a first threshold, the base station determines that the user equipment does not feedback HARQ feedback information, and configures, for the user equipment, a CQI table and/or an MCS table in which a target BLER is relatively low; or when the base station determines that at least one of the foregoing SNR values of the user equipment is greater than or not less than a first threshold, the base station determines that the user equipment feeds back HARQ feedback information, and configures, for the user equipment, a CQI table and/or an MCS table in which a target BLER is relatively high. Then, the base station sends the CSI configuration information to the user equipment, so that the user equipment determines a feedback manner of the HARQ feedback information according to the CSI configuration information. When the CSI configuration information indicates that the user equipment uses the CQI table and/or the MCS table in which a target BLER is relatively low, the user equipment determines not to feed back the HARQ feedback information; or when the CSI configuration information indicates that the user equipment uses the CQI table and/or the MCS table in which a target BLER is relatively high, the user equipment determines to feed back the HARQ feedback information.

By using this manner, the base station gives up retransmission during downlink data transmission for user equipment with a low SNR. By increasing an initial transmission success rate, the base station may assume that the user equipment correctly receives downlink data, and does not need to perform uplink HARQ feedback, so as to reduce damage caused by uplink HARQ feedback information to network performance.

Embodiment 3

When first signaling is TTI frame structure configuration information, there may be specifically the following two cases:

Case 1:

The TTI frame structure configuration information is information configured for each user equipment. A base station may configure at least two TTI frame structures of different lengths for user equipment for downlink data transmission. Specifically, the base station notifies the user equipment of at least two resource groups. The base station notifies the user equipment of TTI frame structure configuration information separately corresponding to the at least two resource groups. Specifically, the resource group may be a subframe, a subframe set, a carrier, a carrier set, a resource block, a resource block set, a CSI process, a CSI process set, a CSI-RS, a CSI-RS set, an access point, an access point set, or the like. Specifically, the carrier may be a component carrier, and the access point may be a base station corresponding to a cell, an RRU, an RRH, a macro cell, a small cell, a micro cell, a home NodeB, or the like.

When the base station configures the at least two TTI frame structures of different lengths for the user equipment, in a normal case, the user equipment needs to perform feedback on received downlink data that is transmitted according to the at least two TTI frame structures of different lengths. To avoid a conflict between a plurality of pieces of uplink HARQ feedback that may appear in this case, the base station may predefine that the user equipment does not perform feedback for a first TTI frame structure in the at least two TTI frame structures of different lengths or does not perform feedback when the uplink HARQ feedback conflicts. A first frame structure may be at least one TTI frame structure other than a longest TTI frame structure in the at least two TTI frame structures of different lengths; or a first frame structure may be at least one TTI frame structure other than a shortest TTI frame structure in the at least two TTI frame structures of different lengths; or a first frame structure may be a shortest or longest TTI frame structure in the at least two TTI frame structures of different lengths. Alternatively, the base station may determine an SNR value in different TTI frame structures according to a CQI reported by the user equipment in different TTI frame structures, and select an SNR value less than or not greater than a first threshold or a smallest SNR value. A TTI frame structure corresponding to the SNR value is the first frame structure.

For example, the base station notifies the user equipment of two resource groups, the base station notifies the user equipment of TTI frame structure configuration information separately corresponding to the two resource groups, and the resource groups are carriers.

The base station configures two carriers for the UE, and the carriers are a carrier A and a carrier B. The base station notifies the UE of TTI frame structure configuration information corresponding to the carrier A and TTI frame structure configuration information corresponding to the carrier B. It is assumed that the carrier A is corresponding to a frame structure whose TTI length is 1 ms, and the carrier B is corresponding to a frame structure whose TTI length is one OFDM symbol. When the UE performs uplink HARQ feedback for the two frame structures or uplink HARQ feedback for the two frame structures conflicts, in a possible implementation, the base station predefines that no HARQ feedback is performed for a shortest TTI frame structure, and therefore, the UE does not perform HARQ feedback on downlink data transmitted on the carrier B. In another possible implementation, the base station predefines that no HARQ feedback is performed for a longest TTI frame structure, and therefore, the UE does not perform HARQ feedback on downlink data transmitted on the carrier A. In still another possible implementation, the base station determines an SNR value in different TTI frame structures according to a CQI in different TTI frame structures that is reported by the user equipment, and selects a smallest SNR value. No HARQ feedback is performed for a TTI frame structure corresponding to the SNR value. It is assumed that the carrier A is a carrier to which interference is relatively low. For example, a carrier of a neighboring cell is a new-type carrier (there is a relatively small quantity of cell-specific reference signals (CRS) or no CRS on the new-type carrier, and therefore, relatively low interference is generated). The carrier B is a carrier to which interference is relatively high. Therefore, an SINR of a signal transmitted on the carrier A is relatively high, and an SINR of a signal transmitted on the carrier B is relatively low. In this case, the base station determines, according to the CQI in different TTI frame structures that is reported by the UE, that the UE does not perform HARQ feedback for a TTI frame structure on the carrier B. Because a CQI reported by the UE on the carrier B is lower than that on the carrier A, the UE may determine not to perform HARQ feedback on downlink data that is transmitted on the carrier B according to a length of one OFDM symbol.

When downlink data transmission in at least two TTIs of different length is scheduled for the UE, the UE feeds back uplink HARQ information for all downlink data in TTIs of different lengths, and a plurality of pieces of uplink HARQ information may conflict. By using this manner, a conflict between a plurality of pieces of uplink HARQ feedback may be eliminated or reduced.

Case 2:

The TTI frame structure configuration information is information configured for each resource group. A base station may independently configure a TTI frame structure for different resource groups, and user equipment in a same resource group has a same TTI frame structure. Specifically, the resource group may be a subframe, a subframe set, a carrier, a carrier set, a resource block, a resource block set, a CSI process, a CSI process set, a CSI-RS, a CSI-RS set, an access point, an access point set, or the like. Specifically, the carrier may be a component carrier, and the access point may be a base station corresponding to a cell, an RRU, an RRH, a macro cell, a small cell, a micro cell, a home NodeB, or the like. When configuring a TTI frame structure for the resource group, the base station may predefine that the user equipment performs feedback or does not perform feedback for a TTI frame structure corresponding to the resource group.

In a possible implementation, the UE determines, by using TTI frame structure configuration information of at least two configured resource groups, whether uplink HARQ information needs to be fed back for downlink data transmission for the resource group. In this case, the UE is required to support downlink receiving of at least two resource groups. For example, the resource group is a carrier, and there are totally two resource groups. It is assumed that there are two carriers in a system, the carriers are a carrier A and a carrier B, and both the carrier A and the carrier B may serve the UE. In a process in which the UE receives data transmitted on the two carriers, the base station predefines that on the two carriers, no HARQ feedback information is fed back to an uplink corresponding to a TTI frame structure of a relatively short length, and HARQ feedback information is fed back to an uplink corresponding to a TTI frame structure of a relatively long length. For example:

1. A short TTI frame structure is configured for the carrier A, and a TTI frame structure of 1 ms is configured for the carrier B. The UE does not feed back HARQ feedback information for downlink data received on the carrier A, and feeds back HARQ feedback information for downlink data received on the carrier B.

2. TTI frame structures configured for both the carrier A and the carrier B are short TTI frame structures. A TTI frame structure of 0.5 ms is configured for the carrier A, and a TTI frame structure of one OFDM symbol is configured for the carrier B. The UE feeds back HARQ feedback information for downlink data received on the carrier A, and does not feedback HARQ feedback information for downlink data received on the carrier B.

In addition, it should be noted that when the base station presets at least two TTI frame structures of different lengths for the user equipment, it only needs to be set that TTI frame structures of different lengths are corresponding to different HARQ feedback manners. In this embodiment of the present disclosure, HARQ feedback manners corresponding to TTI frame structures of different lengths may not be limited.

In this case, for UE that supports only one resource group, the base station may assume that the UE always performs HARQ feedback or does not perform HARQ feedback, or the base station notifies, by using display signaling, the UE whether to perform HARQ feedback.

When downlink data transmission in at least two TTIs of different length is scheduled for the UE, the UE feeds back uplink HARQ information for downlink data in TTIs of different lengths, and a plurality of pieces of uplink HARQ information may conflict. By using this manner, a conflict between a plurality of pieces of uplink HARQ feedback may be eliminated or reduced.

In another possible implementation, the base station independently configures a TTI frame structure for different resource groups, and predefines that TTI frame structures of different lengths are corresponding to different HARQ feedback manners. For example, the resource group is a carrier, and there are totally two resource groups. It is assumed that there are two carriers in a system, the carriers are a carrier A and a carrier B, a short TTI frame structure is configured for the carrier A, and a TTI frame structure of 1 ms is configured for the carrier B. The base station predefines that no HARQ feedback information is fed back to an uplink corresponding to the short TTI frame structure, and HARQ feedback information is fed back to an uplink corresponding to the TTI frame structure of 1 ms. When data transmission on the carrier A is configured for the UE, no HARQ feedback information is fed back to a corresponding uplink, and when data transmission on the carrier B is configured for the UE, HARQ feedback information is fed back to a corresponding uplink. This manner is also applicable to UE that supports only one resource group.

Embodiment 4

When first signaling is repetition quantity information, a specific procedure is as follows:

A base station determines an uplink SNR value of user equipment according to an uplink reference signal sent by the user equipment, for example, an SRS and/or a DMRS. When the uplink SNR value of the user equipment is less than or not greater than a first threshold, the base station performs downlink transmission for the user equipment by means of a plurality of times of blind transmission. That is, when the base station determines that the user equipment does not feed back HARQ feedback information, the base station configures, for the user equipment, transmission that a quantity of times that a same transport data block is retransmitted is greater than 1, where resources that are consecutive in terms of time and/or frequency or resources that are inconsecutive in terms of time and/or frequency are used for the transmission that the quantity of times that a same transport data block is retransmitted is greater than 1. However, when the user equipment determines that the repetition quantity information indicates that a quantity of times that a same transport data block is retransmitted is greater than 1, the user equipment determines not to feed back the HARQ feedback information; or when the user equipment determines that the repetition quantity information indicates that a quantity of times that a same transport data block is retransmitted is not greater than 1, the user equipment determines to feed back the HARQ feedback information.

The base station blindly retransmits a same data packet, and the UE may combine a same data packet, so as to increase a demodulation SNR of the data packet, thereby increasing a transmission success rate of the data packet. The base station assumes that the UE may correctly receive the data packet, and does not need to perform uplink HARQ feedback, so as to reduce damage caused by uplink HARQ feedback information to network performance.

Based on a same disclosure concept, the embodiments of the present disclosure further separately provide a base station and user equipment that are used to implement the information processing method and an information processing system. Principles of resolving a problem by the base station, the user equipment, and the system are similar to the information processing method implemented on the base station side and the information processing method implemented on the user equipment side. Therefore, for implementation of the base station, the user equipment, and the system, refer to implementation of the method, and no repeated description is provided.

Figure 6:
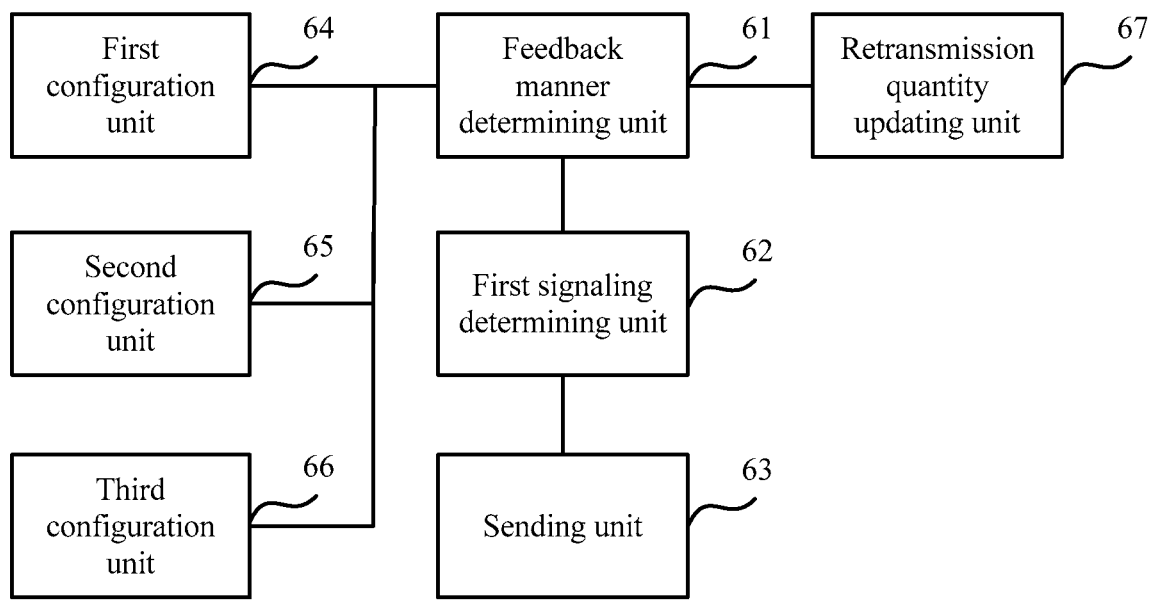
FIG. 6 is a schematic structural diagram of a base station according to an embodiment of the present disclosure.

As shown in FIG. 6, FIG. 6 is a schematic structural diagram of a base station according to an embodiment of the present disclosure. The base station includes:

a feedback manner determining unit 61, configured to determine a feedback manner of HARQ feedback information of user equipment, where the feedback manner includes: feeding back the HARQ feedback information, or skipping feeding back the HARQ feedback information;

a first signaling determining unit 62, configured to determine first signaling according to the feedback manner that is of the HARQ feedback information and that is determined by the feedback manner determining unit 61, where the first signaling implicitly indicates the feedback manner of the HARQ feedback information; and a sending unit 63, configured to send, to the user equipment, the first signaling determined by the first signaling determining unit 62, so that the user equipment determines the feedback manner of the HARQ feedback information according to the first signaling.

Optionally, the feedback manner determining unit 61 may be specifically configured to:

determine a signal-to-noise ratio SNR value of the user equipment; and when the SNR value of the user equipment is less than or not greater than a preset first threshold, determine that the user equipment does not feed back the HARQ feedback information; or when the SNR value of the user equipment is greater than or not less than a preset first threshold, determine that the user equipment feeds back the HARQ feedback information.

That is, when the SNR value of the user equipment is less than the first threshold, the base station determines that the user equipment does not feed back the HARQ feedback information; or when the SNR value of the user equipment is not less than the first threshold, the base station determines that the user equipment feeds back the HARQ feedback information.

Alternatively, when the SNR value of the user equipment is not greater than the first threshold, the base station determines that the user equipment does not feed back the HARQ feedback information; or when the SNR value of the user equipment is greater than the first threshold, the base station determines that the user equipment feeds back the HARQ feedback information.

Optionally, that the feedback manner determining unit 61 determines the signal-to-noise ratio SNR value of the user equipment may include:

determining the SNR value of the user equipment according to a CQI reported by the user equipment; or determining the SNR value of the user equipment according to an uplink reference signal sent by the user equipment.

Optionally, the first signaling may be RRC signaling, MAC signaling, or physical layer signaling.

Optionally, the first signaling may be MCS indication information, and the MCS indication information indicates an MCS index value or a transport block size TBS index value corresponding to an MCS index value; and the first signaling determining unit 62 may be specifically configured to:

when the feedback manner of the HARQ feedback information is skipping feeding back the HARQ feedback information, determine the MCS indication information, where the MCS index value or the TBS index value indicated by the MCS indication information is not greater than a preset second threshold; or when the feedback manner of the HARQ feedback information is feeding back the HARQ feedback information, determine the MCS indication information, where the MCS index value or the TBS index value indicated by the MCS indication information is greater than the second threshold.

Optionally, when the feedback manner of the HARQ feedback information is skipping feeding back the HARQ feedback information, a transport block size indicated by the MCS indication information is determined according to a target value of a block error rate BLER, and the target value of the BLER is less than 0.1.

Optionally, the first signaling may be channel state information CSI configuration information, and the CSI configuration information is channel quality indicator CQI table configuration information and/or modulation and coding scheme MCS table configuration information; and the first signaling determining unit 62 may be specifically configured to:

when the feedback manner of the HARQ feedback information is skipping feeding back the HARQ feedback information, determine CSI configuration information that is used to indicate that the user equipment uses a CQI table and/or an MCS table that do/does not include 256QAM; or when the feedback manner of the HARQ feedback information is feeding back the HARQ feedback information, determine CSI configuration information that is used to indicate that the user equipment uses a CQI table and/or an MCS table that include/includes 256QAM.

In this case, the base station may further include:

a first configuration unit 64, configured to: when the feedback manner that is of the HARQ feedback information and that is determined by the feedback manner determining unit 61 is skipping feeding back the HARQ feedback information, configure, for the user equipment, the CQI table and/or the MCS table that do/does not include the 256QAM; or when the feedback manner that is of the HARQ feedback information and that is determined by the feedback manner determining unit 61 is feeding back the HARQ feedback information, configure, for the user equipment, the CQI table and/or the MCS table that include/includes the 256QAM.

Optionally, the first signaling may be transmission time interval TTI frame structure configuration information;

the TTI frame structure configuration information may be frame structure configuration information required by the user equipment to receive downlink data and/or frame structure configuration information required by the user equipment to send uplink data; and the first signaling determining unit 62 may be specifically configured to:

when the feedback manner of the HARQ feedback information is skipping feeding back the HARQ feedback information, determine TTI frame structure configuration information that is used to indicate that the user equipment uses a shortest TTI frame structure in at least two preset different III frame structures for data transmission; or when the feedback manner of the HARQ feedback information is feeding back the HARQ feedback information, determine TTI frame structure configuration information that is used to indicate that the user equipment uses, for data transmission, a TTI frame structure that is not the shortest in at least two different TTI frame structures.

In this case, the base station may further include:

a second configuration unit 65, configured to: when the feedback manner that is of the HARQ feedback information and that is determined by the feedback manner determining unit 61 is skipping feeding back the HARQ feedback information, configure, for the user equipment, a shortest TTI frame structure in the at least two TTI frame structures of different lengths; or when the feedback manner that is of the HARQ feedback information and that is determined by the feedback manner determining unit 61 is feeding back the HARQ feedback information, configure, for the user equipment, a TTI frame structure that is not the shortest in the at least two TTI frame structures of different lengths.

Optionally, the first signaling may be repetition quantity information; and the first signaling determining unit 62 may be specifically configured to:

when the feedback manner of the HARQ feedback information is skipping feeding back the HARQ feedback information, determine repetition quantity information that is used to indicate that a quantity of times that a same transport data block is retransmitted is greater than 1; or when the feedback manner of the HARQ feedback information is feeding back the HARQ feedback information, determine repetition quantity information that is used to indicate that a quantity of times that a same transport data block is retransmitted is not greater than 1.

In this case, the base station may further include:

a third configuration unit 66, configured to: when the feedback manner that is of the HARQ feedback information and that is determined by the feedback manner determining unit 61 is skipping feeding back the HARQ feedback information, configure, for the user equipment, transmission that a quantity of times that a same transport data block is retransmitted is greater than 1, where resources that are consecutive in terms of time and/or frequency or resources that are inconsecutive in terms of time and/or frequency are used for the transmission that the quantity of times that a same transport data block is retransmitted is greater than 1.

Optionally, the base station may further include:

a retransmission quantity updating unit 67, configured to: when the SNR value that is of the user equipment and that is determined by the feedback manner determining unit 61 is greater than or greater than or equal to the preset first threshold and less than or not greater than a preset third threshold, update a retransmission quantity configured for the user equipment, and use the updated retransmission quantity to perform downlink transmission for the user equipment, where the updated retransmission quantity is greater than the preset retransmission quantity.

For convenience of description, the foregoing parts are divided into modules (or units) according to functions, and are described separately. Certainly, during implementation of the present disclosure, the functions of the modules (or units) may be implemented in one or more pieces of software or hardware.

The base station in this embodiment of the present disclosure may implement the procedure in the embodiment shown in FIG. 4 of the present disclosure.

Figure 7:
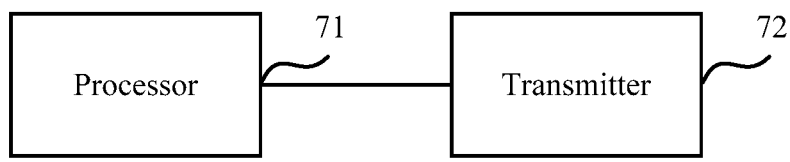
FIG. 7 is a schematic structural diagram of hardware of abase station according to an embodiment of the present disclosure.

Correspondingly, an embodiment of the present disclosure further provides a base station. As shown in FIG. 7, FIG. 7 is a schematic structural diagram of hardware of the base station. The base station includes: a processor 71 and a transmitter 72.

The processor 71 is configured to: determine a feedback manner of hybrid automatic repeat request HARQ feedback information of user equipment, and determine first signaling according to the feedback manner of the HARQ feedback information, where the feedback manner includes: feeding back the HARQ feedback information, or skipping feeding back the HARQ feedback information; the first signaling implicitly indicates the feedback manner of the HARQ feedback information.

The transmitter 72 is configured to send the first signaling to the user equipment, so that the user equipment determines the feedback manner of the HARQ feedback information according to the first signaling.

Optionally, that the processor 71 determines the feedback manner of the HARQ feedback information of the user equipment may include:

determining a signal-to-noise ratio SNR value of the user equipment; and when the SNR value of the user equipment is less than or not greater than a preset first threshold, determining that the user equipment does not feed back the HARQ feedback information; or when the SNR value of the user equipment is greater than or not less than a preset first threshold, determining that the user equipment feeds back the HARQ feedback information.

Optionally, that the processor 71 determines the signal-to-noise ratio SNR value of the user equipment may include:

determining the SNR value of the user equipment according to a channel quality indicator CQI reported by the user equipment; or determining the SNR value of the user equipment according to an uplink reference signal sent by the user equipment.

Optionally, the first signaling may be RRC signaling, MAC signaling, or physical layer signaling.

Optionally, the first signaling may be MCS indication information, and the MCS indication information indicates an MCS index value or a transport block size TBS index value corresponding to an MCS index value; and that the processor determines the first signaling according to the feedback manner of the HARQ feedback information may include:

when the feedback manner of the HARQ feedback information is skipping feeding back the HARQ feedback information, determining the MCS indication information, where the MCS index value or the TBS index value indicated by the MCS indication information is not greater than a preset second threshold; or when the feedback manner of the HARQ feedback information is feeding back the HARQ feedback information, determining the MCS indication information, where the MCS index value or the TBS index value indicated by the MCS indication information is greater than the second threshold.

Optionally, when the feedback manner of the HARQ feedback information is skipping feeding back the HARQ feedback information, a transport block size indicated by the MCS indication information is determined according to a target value of a block error rate BLER, and the target value of the BLER is less than 0.1.

Optionally, the first signaling may be CSI configuration information, and the CSI configuration information is channel quality indicator CQI table configuration information and/or modulation and coding scheme MCS table configuration information; and that the processor 71 determines the first signaling according to the feedback manner of the HARQ feedback information may include:

when the feedback manner of the HARQ feedback information is skipping feeding back the HARQ feedback information, determining CSI configuration information that is used to indicate that the user equipment uses a CQI table and/or an MCS table that do/does not include 256QAM; or when the feedback manner of the HARQ feedback information is feeding back the HARQ feedback information, determining CSI configuration information that is used to indicate that the user equipment uses a CQI table and/or an MCS table that include/includes 256QAM.

Optionally, before the processor 71 determines the first signaling according to the feedback manner of the HARQ feedback information, the processor 71 may be further configured to:

when the feedback manner of the HARQ feedback information is skipping feeding back the HARQ feedback information, configure, for the user equipment, the CQI table and/or the MCS table that do/does not include the 256QAM; or when the feedback manner of the HARQ feedback information is feeding back the HARQ feedback information, configure, for the user equipment, the CQI table and/or the MCS table that include/includes the 256QAM.

Optionally, the first signaling may be TTI frame structure configuration information; and that the processor 71 determines the first signaling according to the feedback manner of the HARQ feedback information may include:

when the feedback manner of the HARQ feedback information is skipping feeding back the HARQ feedback information, determining TTI frame structure configuration information that is used to indicate that the user equipment uses a shortest TTI frame structure in at least two preset different III frame structures for data transmission; or when the feedback manner of the HARQ feedback information is feeding back the HARQ feedback information, determining TTI frame structure configuration information that is used to indicate that the user equipment uses, for data transmission, a TTI frame structure that is not the shortest in at least two different TTI frame structures.

Optionally, before the processor 71 determines the first signaling according to the feedback manner of the HARQ feedback information, the processor 71 may be further configured to:

when the feedback manner of the HARQ feedback information is skipping feeding back the HARQ feedback information, configure, for the user equipment, a shortest TTI frame structure in the at least two TTI frame structures of different lengths; or when the feedback manner of the HARQ feedback information is feeding back the HARQ feedback information, configure, for the user equipment, a TTI frame structure that is not the shortest in the at least two TTI frame structures of different lengths.

Optionally, the first signaling may be repetition quantity information; and that the processor 71 determines the first signaling according to the feedback manner of the HARQ feedback information may include:

when the feedback manner of the HARQ feedback information is skipping feeding back the HARQ feedback information, determining repetition quantity information that is used to indicate that a quantity of times that a same transport data block is retransmitted is greater than 1; or when the feedback manner of the HARQ feedback information is feeding back the HARQ feedback information, determining repetition quantity information that is used to indicate that a quantity of times that a same transport data block is retransmitted is not greater than 1.

Optionally, before the processor 71 determines the first signaling according to the feedback manner of the HARQ feedback information, the processor 71 may be further configured to:

when the feedback manner of the HARQ feedback information is skipping feeding back the HARQ feedback information, configure, for the user equipment, transmission that a quantity of times that a same transport data block is retransmitted is greater than 1, where resources that are consecutive in terms of time and/or frequency or resources that are inconsecutive in terms of time and/or frequency are used for the transmission that the quantity of times that a same transport data block is retransmitted is greater than 1.

Optionally, the processor 71 may be further configured to:

when the SNR value of the user equipment is greater than or greater than or equal to the preset first threshold and less than or not greater than a preset third threshold, update a retransmission quantity configured for the user equipment, and use the updated retransmission quantity to perform downlink transmission for the user equipment, where the updated retransmission quantity is greater than the preset retransmission quantity.

Figure 8:
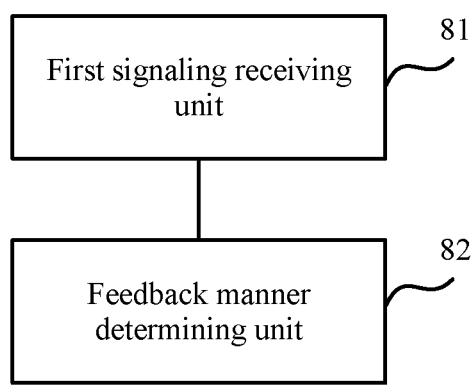
FIG. 8 is a schematic structural diagram of user equipment according to an embodiment of the present disclosure.

As shown in FIG. 8, FIG. 8 is a schematic structural diagram of user equipment according to an embodiment of the present disclosure. The user equipment includes:

a first signaling receiving unit 81, configured to receive first signaling that is sent by a base station and that is used to determine a feedback manner of hybrid automatic repeat request HARQ feedback information of the user equipment, where the feedback manner includes: feeding back the HARQ feedback information, or skipping feeding back the HARQ feedback information; and the first signaling implicitly indicates the feedback manner of the HARQ feedback information; and a feedback manner determining unit 82, configured to determine the feedback manner of the HARQ feedback information according to the first signaling received by the first signaling receiving unit.

Optionally, the first signaling may be RRC signaling, MAC signaling, or physical layer signaling.

Optionally, the first signaling may be MCS indication information, and the MCS indication information indicates an MCS index value or a transport block size TBS index value corresponding to an MCS index value; and the feedback manner determining unit 82 may be specifically configured to:

when the MCS index value or the TBS index value indicated by the MCS indication information is not greater than a preset second threshold, determine not to feedback the HARQ feedback information; or when the MCS index value or the TBS index value indicated by the MCS indication information is greater than a preset second threshold, determine to feed back the HARQ feedback information.

Optionally, the first signaling may be CSI configuration information, and the CSI configuration information is CQI table configuration information and/or MCS table configuration information; and the feedback manner determining unit 82 may be specifically configured to:

when the CSI configuration information indicates that the user equipment uses a CQI table and/or an MCS table that do/does not include 256QAM, determine not to feed back the HARQ feedback information; or when the CSI configuration information indicates that the user equipment uses a CQI table and/or an MCS table that include/includes 256QAM, determine to feed back the HARQ feedback information.

Optionally, the first signaling may be TTI frame structure configuration information; and the feedback manner determining unit 82 may be specifically configured to:

when the TTI frame structure configuration information indicates a shortest TTI frame structure in at least two preset TTI frame structures of different lengths, determine not to feed back the HARQ feedback information; or when the TTI frame structure configuration information indicates a TTI frame structure that is not the shortest in at least two preset TTI frame structures of different lengths, determine to feed back the HARQ feedback information.

Optionally, the first signaling may be repetition quantity information; and the feedback manner determining unit 82 may be specifically configured to:

when the repetition quantity information indicates that a quantity of times that a same transport data block is retransmitted is greater than 1, determine not to feed back the HARQ feedback information; or when the repetition quantity information indicates that a quantity of times that a same transport data block is retransmitted is not greater than 1, determine to feed back the HARQ feedback information.

For convenience of description, the foregoing parts are divided into modules (or units) according to functions, and are described separately. Certainly, during implementation of the present disclosure, the functions of the modules (or units) may be implemented in one or more pieces of software or hardware.

The user equipment in this embodiment of the present disclosure may implement the procedure in the embodiment shown in FIG. 5 of the present disclosure.

Figure 9:
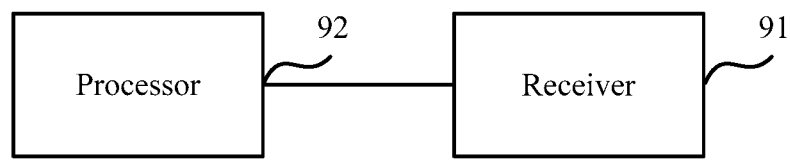
FIG. 9 is a schematic structural diagram of hardware of user equipment according to an embodiment of the present disclosure.

Correspondingly, an embodiment of the present disclosure further provides user equipment. As shown in FIG. 9, FIG. 9 is a schematic structural diagram of hardware of the user equipment. The user equipment includes: a receiver 91 and a processor 92.

The receiver 91 is configured to receive first signaling that is sent by a base station and that is used to determine a feedback manner of hybrid automatic repeat request HARQ feedback information of the user equipment, where the feedback manner includes: feeding back the HARQ feedback information, or skipping feeding back the HARQ feedback information; and the first signaling implicitly indicates the feedback manner of the HARQ feedback information.

The processor 92 is configured to determine the feedback manner of the HARQ feedback information according to the first signaling.

Optionally, the first signaling may be RRC signaling, MAC signaling, or physical layer signaling.

Optionally, the first signaling may be MCS indication information, and the MCS indication information indicates an MCS index value or a transport block size TBS index value corresponding to an MCS index value; and that the processor 92 determines the feedback manner of the HARQ feedback information according to the first signaling may include:

when the MCS index value or the TBS index value indicated by the MCS indication information is not greater than a preset second threshold, determining not to feed back the HARQ feedback information; or when the MCS index value or the TBS index value indicated by the MCS indication information is greater than a preset second threshold, determining, by the user equipment, to feed back the HARQ feedback information.

Optionally, the first signaling may be CSI configuration information, and the CSI configuration information is CQI table configuration information and/or MCS table configuration information; and that the processor 92 determines the feedback manner of the HARQ feedback information according to the first signaling may include:

when the CSI configuration information indicates that the user equipment uses a CQI table and/or an MCS table that do/does not include 256QAM, determining not to feed back the HARQ feedback information; or when the CSI configuration information indicates that the user equipment uses a CQI table and/or an MCS table that include/includes 256QAM, determining to feed back the HARQ feedback information.

Optionally, the first signaling may be TTI frame structure configuration information; and that the processor 92 determines the feedback manner of the HARQ feedback information according to the first signaling may include:

when the TTI frame structure configuration information indicates a shortest TTI frame structure in at least two preset TTI frame structures of different lengths, determining not to feed back the HARQ feedback information; or when the TTI frame structure configuration information indicates a TTI frame structure that is not the shortest in at least two preset TTI frame structures of different lengths, determining to feed back the HARQ feedback information.

Optionally, the first signaling may be repetition quantity information; and that the processor 92 determines the feedback manner of the HARQ feedback information according to the first signaling may include:

when the repetition quantity information indicates that a quantity of times that a same transport data block is retransmitted is greater than 1, determining not to feed back the HARQ feedback information; or when the repetition quantity information indicates that a quantity of times that a same transport data block is retransmitted is not greater than 1, determining to feed back the HARQ feedback information.

Figure 10:
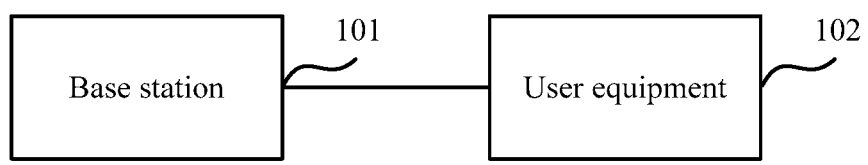
FIG. 10 is a schematic structural diagram of an information processing system according to an embodiment of the present disclosure.

As shown in FIG. 10, FIG. 10 is a schematic structural diagram of an information processing system according to an embodiment of the present disclosure. The system includes: a base station 101 and user equipment 102.

The base station 101 is configured to: determine a feedback manner of HARQ feedback information of the user equipment 102 (which is corresponding to step 41 in the foregoing embodiments); determine first signaling according to the feedback manner of the HARQ feedback information (which is corresponding to step 42 in the foregoing embodiments); and send the first signaling to the user equipment 102 (which is corresponding to step 43 in the foregoing embodiments), where the first signaling implicitly indicates the feedback manner of the HARQ feedback information; the feedback manner includes: feeding back the HARQ feedback information, or skipping feeding back the HARQ feedback information.

The user equipment 102 is configured to: receive the first signaling sent by the base station 101 (which is corresponding to step 51 in the foregoing embodiments), and determine the feedback manner of the HARQ feedback information according to the first signaling (which is corresponding to step 52 in the foregoing embodiments).

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. In addition, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the protection scope defined by the following claims and their equivalent technologies.

What is claimed is:

1. An information processing method, comprising:
receiving, by user equipment:
  first signaling sent by the base station and used to determine a feedback manner of hybrid automatic repeat request (HARQ) feedback information of the user equipment, the first signaling indicating the feedback manner, wherein the first signaling comprises: transmission time interval (TTI) frame structure configuration information, and retransmission quantity information, and wherein the feedback manner comprises:
  feeding back the HARQ feedback information, or
  skipping feeding back the HARQ feedback information; and
determining, by the user equipment, the feedback manner of the HARQ feedback information according to the first signaling, comprising:
  when the TTI frame structure configuration information indicates a shortest TTI frame structure in at least two preset TTI frame structures of different lengths, or when the retransmission quantity information indicates that a quantity of times that a same transport data block is retransmitted is greater than 1:
    determining, by the user equipment not to feed back the HARQ feedback information; and
    performing, by the user equipment, data transmission with the base station in the absence of sending HARQ feedback information to the base station; or
  when the TTI frame structure configuration information indicates a TTI frame structure that is not the shortest in at least two preset TTI frame structures of different lengths, or when the retransmission quantity information indicates that a quantity of times that a same transport data block is retransmitted is not greater than 1:
    determining, by the user equipment, to feed back the HARQ feedback information.

2. The method according to claim 1 further comprising receiving, by the user equipment, a notification sent by the base station of at least two resource groups.

3. The method according to claim 2, wherein the TTI frame structure configuration information is configured by the base station separately for user equipment downlink transmission in the at least two resource groups.

4. The method according to claim 2, wherein user equipment in a same resource group has a same TTI frame structure.

5. The method according to claim 2, wherein the at least two resource groups include at least two component carriers.

6. A base station, comprising:
a processor, configured to:
  determine a feedback manner of hybrid automatic repeat request (HARQ) feedback information of user equipment, and
  determine first signaling according to the feedback manner of the HARQ feedback information, the first signaling indicating the feedback manner, wherein the first signaling comprises: transmission time interval (TTI) frame structure configuration information, and retransmission quantity information, and wherein the feedback manner comprises:
  feeding back the HARQ feedback information; or
  skipping feeding back the HARQ feedback information; and
a transmitter, configured to:
  send the first signaling to the user equipment for determining the feedback manner of the HARQ feedback information according to the first signaling,
wherein to determine the first signaling according to the feedback manner of the HARQ feedback information, the processor is configured to:
  when the feedback manner of the HARQ feedback information is skipping feeding back the HARQ feedback information:
    determine the TTI frame structure configuration information for indicating to the user equipment to use a shortest TTI frame structure in at least two preset different TTI frame structures for data transmission, or determine the retransmission quantity information for indicating that a quantity of times that a same transport data block is retransmitted is greater than 1; and
    perform data transmission with the user equipment in the absence of receiving HARQ feedback information from the user equipment; or when the feedback manner of the HARQ feedback information is feeding back the HARQ feedback information:
determine the TTI frame structure configuration information for indicating to the user equipment to use, for data transmission, a TTI frame structure that is not the shortest in at least two different TTI frame structures, or determine retransmission quantity information for indicating that a quantity of times that a same transport data block is retransmitted is not greater than 1.

7. The base station according to claim 6, wherein the transmitter is further configured to notify the user equipment of at least two resource groups.

8. The base station according to claim 7, wherein the TTI frame structure configuration information is configured by the base station separately for user equipment downlink transmission in the at least two resource groups.

9. The base station according to claim 7, wherein user equipment in a same resource group has a same TTI frame structure.

10. The base station according to claim 7, wherein the at least two resource groups include at least two component carriers.

11. A terminal, comprising:
a receiver, configured to:
receive first signaling sent by the base station and used to determine a feedback manner of hybrid automatic repeat request (HARQ) feedback information of the terminal, the first signaling indicating the feedback manner, wherein the first signaling comprises: transmission time interval (TTI) frame structure configuration information; and retransmission quantity information, and wherein the feedback manner comprises:
feeding back the HARQ feedback information, or skipping feeding back the HARQ feedback information; and a processor, configured to determine the feedback manner of the HARQ feedback information according to the first signaling, comprising:
when the TTI frame structure configuration information indicates a shortest TTI frame structure in at least two preset TTI frame structures of different lengths, or when the retransmission quantity information indicates that a quantity of times that a same transport data block is retransmitted is greater than 1:
determine not to feed back the HARQ feedback information; and
perform data transmission with the base station in the absence of sending HARQ feedback information to the baser station; or
when the TTI frame structure configuration information indicates a TTI frame structure that is not the shortest in at least two preset TTI frame structures of different lengths, or when the retransmission quantity information indicates that a quantity of times that a same transport data block is retransmitted is not greater than 1:
determine to feed back the HARQ feedback information.

12. The terminal according to claim 11, wherein the receiver is further configured to receive a notification sent by the base station of at least two resource groups.

13. The terminal according to claim 12, wherein the TTI frame structure configuration information is configured by the base station separately for user equipment downlink transmission in the at least two resource groups.

14. The terminal according to claim 12, wherein user equipment in a same resource group has a same TTI frame structure.

15. The terminal according to claim 12, wherein the at least two resource groups include at least two component carriers.

* * * * *